US005873069A

United States Patent [19]
Reuhl et al.

[11] Patent Number: 5,873,069
[45] Date of Patent: Feb. 16, 1999

[54] SYSTEM AND METHOD FOR AUTOMATIC UPDATING AND DISPLAY OF RETAIL PRICES

[75] Inventors: Douglas G. Reuhl, Madison; Howard J. Lenerz, Jr., Verona; Laurie J. Vosen, Madison, all of Wis.

[73] Assignee: American TV & Appliance of Madison, Inc., Madison, Wis.

[21] Appl. No.: 542,917

[22] Filed: Oct. 13, 1995

[51] Int. Cl.⁶ .................................................. G06F 17/60
[52] U.S. Cl. ...................... 705/20; 235/375; 235/378; 364/479.08; 705/26
[58] Field of Search .................... 235/375, 378, 235/383; 364/464.1, 479.08; 705/20, 26; 395/220, 226

[56] References Cited

U.S. PATENT DOCUMENTS

| | | |
|---|---|---|
| 1,927,702 | 9/1933 | Foss . |
| 3,581,072 | 5/1971 | Nymeyer . |
| 3,637,989 | 1/1972 | Howard et al. . |
| 3,688,087 | 8/1972 | Howard et al. . |
| 4,034,839 | 7/1977 | Lee . |
| 4,446,528 | 5/1984 | Marmon . |
| 4,486,853 | 12/1984 | Parsons . |
| 4,500,880 | 2/1985 | Gomersall et al. ................ 340/825.35 |
| 4,528,638 | 7/1985 | Hatta et al. . |
| 4,567,359 | 1/1986 | Lockwood . |
| 4,799,156 | 1/1989 | Shavit et al. . |
| 4,942,616 | 7/1990 | Linstroth et al. . |
| 4,992,940 | 2/1991 | Dworkin . |
| 4,994,964 | 2/1991 | Wolfberg et al. . |
| 5,063,506 | 11/1991 | Brockwell et al. . |
| 5,117,354 | 5/1992 | Long et al. . |
| 5,128,861 | 7/1992 | Kagami et al. . |
| 5,128,862 | 7/1992 | Mueller . |
| 5,132,899 | 7/1992 | Fox . |
| 5,172,314 | 12/1992 | Poland et al. . |
| 5,191,522 | 3/1993 | Bosco et al. . |
| 5,212,644 | 5/1993 | Frisch . |
| 5,249,120 | 9/1993 | Foley . |
| 5,270,922 | 12/1993 | Higgins . |
| 5,297,032 | 3/1994 | Trojan et al. . |
| 5,313,560 | 5/1994 | Maruoka et al. . |
| 5,331,544 | 7/1994 | Lu et al. . |
| 5,339,392 | 8/1994 | Risberg et al. . |
| 5,347,452 | 9/1994 | Bay, Jr. . |
| 5,420,786 | 5/1995 | Felthauser et al. . |
| 5,422,809 | 6/1995 | Griffin et al. . |

OTHER PUBLICATIONS

DB:Solutions, Inc., DB:$ Retailer's Advantage Brochure.
Data Index Inc., CAPS (Custom Auto–Pricing System) Information Sheets.
Chris O'Leary, "United Supermarkets Upgrading Systems", Supermarket News, v 44, n 32, pp. 11–12, Aug. 8, 1994.
John Kador, "Helping Systems Keep Up With BI–LO", Capacity Management Review, v 20, n 6, pp. 7, 8, 10, Jun. 1992.
"UK: Marketing Guide—Pricing", Marketing, p. 17, Aug. 9, 1990.
"USA: A Revolution in Supermarket Labeling", Super Marketing, p. 28, Sep. 9, 1988.

*Primary Examiner*—Gail O. Hayes
*Assistant Examiner*—William N. Hughet
*Attorney, Agent, or Firm*—Teresa J. Welch; Stroud, Stroud, Willink, Thompson & Howard

[57] ABSTRACT

An enterprise-wide integrated computer system for storing, processing and reporting pricing information regarding a plurality of products in a plurality of stores in a plurality of markets, including a pricing function for pricing and re-pricing products responsive to market price changes. Pricing and re-pricing are accomplished on a product-by-product and a market-by-market basis.

19 Claims, 73 Drawing Sheets

TABLE NAME 216

| TABLE IDENTIFIER | FIELD 1 | FIELD 2 | FIELD 3 |
|---|---|---|---|
|  |  |  |  |
|  | SAMPLE |  |  → RECORD 1 |
|  |  |  |  → RECORD 2 |
|  | DATA |  |  → RECORD 3 |
|  |  |  |  |
|  |  |  |  |

*etc.*

FIG. 3

ITEM TABLE 218

| SKU | DESC | VENDOR | VENDOR MODEL NO. |
|---|---|---|---|
|  |  |  |  |
|  | SAMPLE |  |  |
|  | DATA |  |  |
|  |  |  |  |
|  |  |  |  |
|  |  |  |  |

FIG. 4

CPTPRC - Competitor Price Information Screen

| Mkt | Sku | Vend | Model |
|---|---|---|---|
| APP | 008255033 | SONY | KV27S15 |

| Company | Location | Price | Fn Cd | Prom Ends | Prem Sku | Prm Qty | Last Shop |
|---|---|---|---|---|---|---|---|
| USER | | 377.99 | | | | | |
| COMPETITOR A | NORTH | 384.99 | 10 | 9605 | | | 22-SEP-95 |
| COMPETITOR A | EAST | 389.99* | | | | | 26-SEP-95 |
| COMPETITOR B | SOUTH | 419.00 | | | | | 23-SEP-95 |
| COMPETITOR C | WEST | 395.00 | | | | | 22-SEP-95 |

Deriv Vendor:

Count: *0

FIG. 8

```
Store     : 20
From Date: 10-OCT-95                    Sorted by:
To Date   : 10-OCT-95

Dept      : TV and VCR
Store     : 20

Comp
ST SO#           Slsp Sku       Vend Vsn          Vend
---------------------------------------------------------
20 10105205218 54
NEGOTIATION 20 10105205296 YT    036227038 JVC  HRJ620

20 10105205315 YT 20 10105205468 54    008232035 MAGN TP2526

20 10105205471 DK    019211022 TOSH CX35E6

20 10105208003 PZ    002017160 JVC  C13CL6

****  END OF PEXDET REPORT  ****
```

FIG. 15A pexdet - Price Exception Detail Report
Store/Dept/Salesperson/Sales Order Number

|         |         |         |      |     | Sell | Act |
|---------|---------|---------|------|-----|------|-----|
| Compet  | Selling | Active  | Sell | Act | Pln  | Pln |
| Vsn     | Price   | Price   | Pln  | Pln | End  | End |
|---------|---------|---------|------|-----|------|-----|
|         | 0.00    | 0.00    | 10   | 1   | 9602 |     |
|         | 271.48  | 269.98  | 0    | 0   |      |     |
|         | 0.00    | 0.00    | 0    | 0   |      |     |
|         | 290.99  | 379.99  | 0    | 0   |      |     |
|         | 1388.00 | 1599.97 | 0    | 0   |      |     |
|         | 199.95  | 173.00  | 0    | 0   |      |     |

FIG. 15B

```
                                              Page:           1
(SO#)                                         Date:  10/11/95
                                              Time:  00:20:41

Upd Company
Reason              Mgr   Mkt Name
----------------------------------------
Plan Change PTag Diff than Family Sale PTag Diff than PTag Diff than PTag Diff than
```

FIG. 15C

CPTAD - Competitor Ad Response Entry Screen

```
                                                    --- Competitor Ad ---
          Markets              Company    From Date   To Date
          MSN                  COMPET     24-SEP-95   30-SEP-95

User                           Cmpt                      Cmpt Ad   Ad Resp
Mkt Sku #         Vend  User Vsn        Vend  Compet Vsn          Price     Price     Inits
MSN 034017120     PANA  PV2501                PV2501              159.99    151.99    LCH
MSN 047312208     PION  VSX453                ** SAME **          249.99    242.49    MAI
MSN 047312222     SONY  STRD865               ** SAME **          349.99    339.49    MAI
MSN 056001286     SONY  CDPC365               ** SAME **          199.99    193.99    MAI
MSN 056003052     PION  PDF904                ** SAME **          449.99    436.49    MAI
MSN 070212003     AIWA  NSXV20                ** SAME **          299.99    290.99    MAI
MSN 070221014     CRAI  HS3100                ** SAME **          119.99    116.39    MAI
MSN 070223068     SONY  MHCC405               ** SAME **          499.99    484.99    MAI
MSN 076001672     PION  KE1900          BLAU  PUEBLO              149.99    149.99    MAI
MSN 076100115     JVC   KSR127                ** SAME **           79.99     77.59    MAI
MSN 076201094     SONY  CDX4090         PANA  CQPD620             249.99    249.99    MAI
MSN 076201119     SONY  CDX5090               ** SAME **          329.99    320.09    MAI
MSN 077101358     PION  GMX304                ** SAME **          249.99    242.49    MAI
MSN 083496971     PION  PKG_FOR_PCC720/ MOTO  88019/FLIP           19.99     19.99    MAI
```

Count: 14

FIG. 17

CPTSHP - Competitor Shopping Entry Screen

| Mkt | Company | Loc | Vendor From To | Minor From To |
|---|---|---|---|---|
| MSN | COMPETA | WEST | AAAA ZZZZ | 000 010 |

| Sku # | Comp Vend | Company Vsn | | Cmpt Vend | Compet Vsn | | Prc Type | Old Price | End Date 19-OCT-95 | Chg ? | New Price |
|---|---|---|---|---|---|---|---|---|---|---|---|
| 002013035 | DAEW | DTQ1423FC | | SAMU | TTB1320 | | REG | 149.95 | | | |
| 002014051 | SAMU | TTB1340 | X | SAMU | TTB1340 | X | REG | 149.99 | | | |
| 006016023 | DAEW | DTQ2023 | | SAMU | TXB1930 | | REG | 189.00 | | | |
| 002016055 | FISH | PC4013 | | SANY | AM1304 | | REG | 159.99 | | | |
| 008232061 | SANY | AV2755 | | SANY | AV2755 | | REG | 349.99 | | | |
| 006021151 | FISH | PC4020 | | SANY | AVM2004 | | REG | 199.99 | | | |
| 008228036 | FISH | PC4525 | | SANY | AVM2554 | | REG | 277.99 | | | |
| 008236122 | FISH | PC4527 | | SANY | AVM2754 | | REG | 349.99 | | | |
| 002017083 | SHAR | 13FM50 | X | SHAR | 13FM50 | X | REG | 139.99 | | | |
| 008230029 | SHAR | 27GS60 | | SHAR | 27GS60 | | REG | 349.99 | | | |
| 000002016 | SONY | FDT5BX5W | | SONY | FDT5BX5W | | REG | .00 | | | |
| 002021056 | SONY | KV13M10 | | SONY | KV13M10 | | REG | 239.99 | | | |
| 002022046 | SONY | KV13TR28 | | SONY | KV13TR29 | | REG | 259.99 | | | |

Count: *0

FIG. 18

```
LSTSHP - Last Shopped Query
+----------------------------------------------------------------------+
| SKU Range:    000000000 to 999999999    Vendor Range: AAAA to ZZZZ   |
| Minor Range:000         to 002          Competitor: COMPET COMPETITOR A |
| Market(s):  MSN                                                      |
+----------------------------------------------------------------------+

----- Seller -----    ----- Competitor -----   Last
Mkt Location SKU         Vend VSN           Vend VSN                Shopped
MSN EAST     000002016   SONY FDT5BX5W                              05-MAR-95
MSN WEST     000002016   SONY FDT5BX5W
MSN EAST     000018019   RCA  E05201BK
MSN WEST     000018019   RCA  E05201BK
MSN EAST     000020014   QUAS TP1015        NANA CT10R11            11-JUN-95
MSN WEST     000020014   QUAS TP1015        NANA CT10R11            09-JUN-95
MSN EAST     000020052   RCA  E09305WH
MSN WEST     000020052   RCA  E09305WH
MSN EAST     000021042   RCA  E09304WH
MSN WEST     000021042   RCA  E09304WH
MSN EAST     000021105   QUAS TP1016        PANA CT10R11            11-JUN-95
MSN WEST     000021105   QUAS TP1016        PANA CT10R11            14-SEP-95
MSN EAST     000023010   SONY FDT5BX5                               05-MAR-95
MSN EAST     000028010   SONY KV9PT40                               24-SEP-95

Count: 14
```

FIG. 19 prclst - Active Price Listing Report
Sorted by: Minor, Vendor, VSN

Market    :MSN
Store     :10
Mnr Range :000 - 010
Vend Range:AAAA - ZZZZ
Sku Type  :(A)ll
Prem Only :N
Floor Only:Y
Family Prc:Y

| Mnr | Vend | Vsn | Sku | Desc | Family | Regular Price | Active Price |
|-----|------|-----|-----|------|--------|---------------|--------------|
| 000 | ACTI | ACN5911 | 000016015 | 9" AC/DC | 01601 | 199.97 | 199.90 |
| 000 | AVAN | C503RW | 000013019 | 5" COLOR | 01301 | 169.98 | 169.98 |
| 000 | JVC | HRP1UJ X | 000075007 | 4 HD HIFI/LCD M | 07500 | 699.95 | 699.95 |
| 000 | RCA | E05201BK | 000018019 | 5" AC/DC | 01801 | 239.97 | 239.97 |
| 000 | RCA | E09304WH | 000021042 | 9" SPACESAVER A | 02104 | 259.97 | 259.90 |

FIG. 20A

Date: 10/11/95
Time: 10:33:37
Page: 1

| Family Price | Flr Qty | Fin Pln | End Date | Prem Sku | Prem Qty |
|---|---|---|---|---|---|
| 180.45 | 2 | | | | 0 |
| 158.49 | 1 | | | | 0 |
| 674.98 | 1 | | | | 0 |
| 213.99 | 1 | | | | 0 |
| 236.95 | 1 | | | | 0 |

FIG. 20B

| | | | | | | |
|---|---|---|---|---|---|---|
| 000 | RCA | E09305WH | 000020052 | 9" | 02005 | 249.95 | 249.95 |
| 000 | RCA | E09535 X | 000023008 | 9" AC/DC REMOTE | 02300 | 269.95 | 256.45 |
| 000 | SONY | FDT5BX5 | 000023010 | 5" AC/DC | 02301 | 299.99 | 299.99 |
| 000 | SONY | FDT5BX5W | 000002016 | 5" COLOR TV | 00201 | 299.95 | 299.95 |
| 000 | SONY | KV9PT20 | 000030015 | 9" AC/DC | 03001 | 349.97 | 349.97 |
| 000 | SONY | KV9PT40 | 000028010 | 9" REMOTE | 02801 | 329.97 | 329.97 |
| 000 | ZENI | SL0953X  X | 000021030 | 9"AC/DC REMOTE | 02103 | 279.95 | 279.95 |
| 000 | ZENI | SM0953X | 000021028 | 9" AC/DC REMOTR | 02102 | 279.98 | 279.98 |

* End of Report *

FIG. 20C

|        |   |       |   |
|--------|---|-------|---|
|        |   |       | o |
|        |   |       | o |
|        |   |       | o |
|        |   |       | o |
|        |   |       | o |
|        |   |       | o |
|        |   |       | o |
|        |   |       | o |
| 225.98 | 1 |       |   |
| 244.73 | 1 |       |   |
| 276.00 | 1 |       |   |
| 278.98 | 2 |       |   |
| 325.49 | 4 | 10 9605 |   |
| 306.49 | 1 | 10 9605 |   |
| 248.48 | 1 |       |   |
| 248.49 | 2 |       |   |

FIG. 20D

PRICES - Item Price Query

| Mkt | Comp % | Loc % | Wks Hist | SKU | Vend | Model |
|---|---|---|---|---|---|---|
| MSN | | | 3 | 008255033 | SONY | KV27S15 |

| Mkt | Comp | Loc | Price Type | Price | From | To | Fin Plan | Promo End Dt | Prem Sku# |
|---|---|---|---|---|---|---|---|---|---|
| MSN | User | 10 | ACT | 599.99 | 01-OCT-95 | 08-OCT-95 | 10 | 9702 | |
| MSN | User | 10 | ACT | 549.99 | 25-SEP-95 | 01-OCT-95 | 10 | 9702 | |
| MSN | User | 10 | ACT | 563.99 | 18-SEP-95 | 25-SEP-95 | 10 | 9702 | |
| MSN | User | 10 | ACT | 564.99 | 10-SEP-95 | 18-SEP-95 | | | |
| MSN | User | 10 | REG | 599.99 | 23-MAY-95 | 31-DEC-99 | | | |
| MSN | User | 12 | ACT | 599.99 | 01-OCT-95 | 08-OCT-95 | 10 | 9702 | |
| MSN | User | 12 | ACT | 549.99 | 25-SEP-95 | 01-OCT-95 | 10 | 9702 | |
| MSN | User | 12 | ACT | 563.99 | 18-SEP-95 | 25-SEP-95 | 10 | 9702 | |
| MSN | User | 12 | ACT | 564.99 | 10-SEP-95 | 18-SEP-95 | | | |
| MSN | User | 12 | REG | 599.99 | 23-MAY-95 | 31-DEC-99 | | | |
| MSN | COMPET | EAST | REG | 549.99 | 24-SEP-95 | 01-OCT-95 | | | |
| MSN | COMPET | EAST | REG | 563.99 | 17-SEP-95 | 25-SEP-95 | | | |
| MSN | COMPET | EAST | REG | 599.99 | 11-SEP-95 | 18-SEP-95 | | | |

Cmpt Vsn: _____

Count: *0      v

Market: MSN
Company: CMPTA
Location: WEST
Minor: 047 - RECEIVERS shprpt -
Sort

| Vend | VSN | Last Shop | Reg. Price | Sale |
|------|--------|-----------|------------|------|
| JVC | RX212BK | 06-OCT-95 | | |
| JVC | RX317TN | 06-OCT-95 | | |
| JVC | RX517VTN | 06-OCT-95 | | |
| JVC | RX717VTN | 06-OCT-95 | | |
| JVC | RX815VTN | 31-AUG-95 | | |
| JVC | RX817VTN | 06-OCT-95 | | |
| PION | VSX453 | 06-OCT-95 | | |
| PION | VSX454 | 06-OCT-95 | | |
| PION | VSX504S | 06-OCT-95 | | |

FIG. 22B

Competitive Shopping Report
: Compt Vend, Compt VSN

Page: 1
Date: 10/11/95
Time: 09:09:49

| Price | Compt Vend | Competitive VSN |
|---|---|---|
| | JVC | RX212BK |
| | JVC | RX317TN |
| | JVC | RX517VTN |
| | JVC | RX717VTN |
| | JVC | RX815VTN |
| | JVC | RX817VTN |
| | PION | VSX453 |
| | PION | VSX454 |
| | PION | VSX504S |

FIG. 22C

| PION | VSXD604S | 06-OCT-95 |
| PION | VSXD703  | 31-AUG-95 |
| SHER | RX1010   |           |
| SHER | RX2030   | 08-SEP-95 |
| SONY | STRD1015 | 22-SEP-95 |
| SONY | STRD365  | 06-OCT-95 |
| SONY | STRD565  | 06-OCT-95 |
| SONY | STRD665  | 06-OCT-95 |
| SONY | STRD865  | 06-OCT-95 |
| SONY | STRD965  | 06-OCT-95 |

\*\*\* End of shprpt Report \*\*

FIG. 22D

| PION | VSXD604S |
| PION | VSXD703 |
| SHER | RX1010 |
| SHER | RX2030 |
| SONY | STRD1015 |
| SONY | STRD365 |
| SONY | STRD565 |
| SONY | STRD665 |
| SONY | STRD865 |
| SONY | STRD965 |

```
VALADD - Value Added Table Maintenance
+----------------------------+------------------------+
|  Markets                   | Begin Date   End Date  |
|  APP_MIL_MQT_MSN_RFD       | 24-SEP-95    30-SEP-95 |
+----------------------------+------------------------+

Sku Range                      Dollar Range
   From        To                 From         To
                                  300.00

Minor Range                    Vendor Range
   From   To                      From         To
   000    025

Sku Types                      Style
   R  T  D                        FOCUS

+---+------+-----+----+----+----------+-----+------+--------------------------+
| % Off | $ Off | Pln | Ends | Prem Sku# | Qty | Sub? | Description            |
|       |       | 10  | 9605 |           |     |      | No_pay,_0%_if_paid_when_due. |
+---+------+-----+----+----+----------+-----+------+--------------------------+

Count: *0
```

FIG. 23

```
                                    flarpt - Price Change Report -
                                    Sorted by: Major, Minor, Vendor, Market: RFD
Store :20
Major :047   - STEREO Flr  Trf                                                                Tag   Prc
Qty  Qty  Vend  Vsn            Sku              Desc                    Type  Chg
---  ---  ----  ----           ---------------  ------------------      ----  ----
047 - RECEIVERS

1        JVC   RX317TN        047-11108-6      AM/FM RECEIVER          REG    Y

1        SONY  STRD365        047-12100-1      RECEIVER                REG    Y

047S - SURROUND SOUND RECEIVERS

1        JVC   RX817VTN       047-41303-6      DPL RECEIVER            REG    Y

1        PION  VSX454         047-31223-4      A/V RECEIVER            REG    Y

1        PION  VSX504S        047-41273-1      A/V RECEIVER            REG    Y
```

FIG. 24A

| Flash Model | Active Price | Promo Chg | Finance | Prem Qty | Prem Desc | Cmptr |
|---|---|---|---|---|---|---|
| | 168.99 | N | | | | |
| | 178.99 | N | | | | CMPTA |
| | | | | | | CMPTB |
| | 428.95 | N | 10-9605 | | | CMPTA |
| | 268.99 | N | 10-9605 | | | CMPTA |
| | 359.95 | N | 10-9605 | | | CMPTA |

Date: 10/10/95
Time: 14:36:24
Page: 1

FIG. 24B

| | | | | | | |
|---|---|---|---|---|---|---|
| 3 | SONY | STRD665 | 047-31201-8 | DOLBY PRO LOGIC | REG | Y |
| 1 | SONY | STRD865 | 047-31222-2 | DOLBY PRO LOGIC | REG | Y |

049 - SPEAKERS

| | | | | | | |
|---|---|---|---|---|---|---|
| 2 | JBL | J2050 | 049t00049-9 | BOOKSHELF SPKR | REG | Y |
| 2 | JBL | MR26 | 049-00055-2 | BOOKSHELF SPKR | REG | Y |
| 2 | JBL | MR38 | 049-00090-6 | BOOKSHELF SPKR | REG | Y |
| 5 | JBL | MRV308 | 049-10113-8 | TOWER SPEAKER | REG | Y |
| 2 | JBL | MRV310 | 049-10158-2 | TOWER SPEAKER | REG | Y |

050 - ANALOG

| | | | | | | |
|---|---|---|---|---|---|---|
| 1 | JVC | TDW317TN | 050-00107-6 | DUAL CASS | REG | Y |
| 1 | PION | CTW504R | 050-00132-9 | DUAL CASSETTE | REG | Y |

FIG. 24C

| | | | |
|---|---|---|---|
| 249.98 | N | 10-9605 | CMPTB |
| 328.98 | N | 10-9605 | CMPTA |
| 59.99 | N | | CMPTB |
| 89.95 | N | | CMPTA |
| 139.95 | N | | CMPTA |
| 169.95 | N | | CMPTB |
| 229.95 | N | | CMPTA |
| 179.95 | N | | CMPTB |
| 159.95 | N | | CMPTB |

FIG. 24D

056G - CHANGER

| | | | | | |
|---|---|---|---|---|---|
| 1 | MAGN | CDC748 | 056-00132-5 | CD CHANGER | REG | Y |
| 1 | PION | PDF904 | 056-00305-2 | 100 DISC CD CHA | REG | Y |
| 1 | SONY | CDPC265 | 056-00100-8 | CD CAROUSEL | REG | Y |
| 1 | SONY | CDPC545 | 056-00204-8 | CD CAROUSEL | REG | Y |

\*\*\* End of Report \*\*\*

FIG. 24E

| | | | |
|---|---|---|---|
| 119.99 | N | | CMPTA |
| 348.95 | N | 10-9605 | CMPTA |
| 158.95 | N | | CMPTC |
| 239.95 | N | 10-9605 | CMPTB |

FIG. 24F

```
Market: RFD
Store :20
Major :250  - APPLIANCE
                                                                batrpt - Price Change Report -
                                                                Sorted by: Major, Minor, Vendor, Flr  Trf                                                                        Tag   Prc
Qty  Qty  Vend  Vsn              Sku            Desc                            Type  Chg
---  ---  ----  ---              ---            ----                            ----  ---
250 - WASHERS 1        SPEE  AWM371W2         250-27070-0    WASHER                          REG   Y 1        WHIR  LSC8244DQ        250-33030-4    WASHER                          REG   Y 0        WHIR  LSC8244DZ        250-33031-6    WASHER                          REG   Y

252 - DRYERS ELECTRIC

1        MAYT  LDE8424ACE       252-39000-9    EL-DRYER                        REG   Y

0        WHIR  LER2614DW        252-24000-2    EL-DRYER                        REG   Y
```

FIG. 25A

Date: 10/11/95
Time: 00:29:25
Page: 1

Batch
Model

| Active Price | Promo Chg | Finance | Prem Qty | Prem Desc | Cmptr |
|---|---|---|---|---|---|
| 369.97 | N | 10-9605 | | | CMPTA |
| 428.97 | N | 10-9605 | | | CMPTA |
| 428.97 | N | 10-9605 | | | CMPTA |
| 398.97 | N | 10-9605 | | | CMPTA |
| 187.99 | N | | | | CMPTA |

FIG. 25B

```
255 - RANGES ELECTRIC

1     WHIR  RF302BXDN       255-24051-2  EL-RANGE           REG  Y
   0     WHIR  RF302BXDW       255-24050-0  EL-RANGE           REG  Y

264 - PACKAGES

GENE  WWA5600SAA/DDG7 264-58008-3  ALMOND GAS PGK     REG  Y
         GENE  DDG7080SAA      253260017    Flr Qty: 0
         GENE  WWA5600SAA      250360016    Flr Qty: 0

GENE  WWA8630SWW/DDE7 264-41894-8  WASHER/DRYER       REG  Y
         GENE  DDE7200SWW      252290007    Flr Qty: 1
         GENE  WWA8630SWW      250390108    Flr Qty: 1

GENE  WWA8935SAA/DDE8 264-11044-0  ALMOND PACKAGE     REG  Y
         GENE  DDE8505SAA      252370110    Flr Qty: 0
         GENE  WWA8935SAA      250430116    Flr Qty: 0
```

| | |
|---|---|
| 10-9605 N 299.95 | |
| 10-9605 N 299.95 | |
| N 668.95 | |
| N 698.95 | |
| N 828.95 | |
| N 868.95 | |
| N 828.95 | |

```
GENE  WWA8935SAA/DDG8  264-97102-3  ALMOND GAS PACK   REG  Y
GENE  DDG8585SAA       253370010    Flr Qty: 0
GENE  WWA8935SAA       250430116    Flr Qty: 0

GENE  WWA8935SWW/DDE8  264-50623-2  WHITE PACKAGE     REG  Y
GENE  DDE8505SWW       252370108    Flr Qty: 1
GENE  WWA8935SWW       250430104    Flr Qty: 1
```

\*\*\* End of Report \*\*\*

FIG. 25E

```
                                       futtag - Future Price Change
                                            Sorted by: Major, Minor,
Market:MSN
Store :10
Major :000    - TELEVISION Flr  Trf                                               Tag    Prc
Qty  Qty  Vend  Vsn         Sku           Desc         Type   Chg
---  ---  ----  ----        ---           ----         ----   ---
000 - TV LESS THAN 13"

2        ACTI  ACN5911     000-01601-5   9" AC/DC     SALE   Y

1        AVAN  C503RW      000t01301-9   5" COLOR     SALE   Y

1        JVC   HRP1UJ X    000*07500-7   4 HD HIFI/LCD M  SALE   Y

1        RCA   E05201BK    000t01801-9   5" AC/DC     SALE   Y

1        RCA   E09304WH    000*02104-2   9" SPACESAVER A  SALE   Y

1        RCA   E09305WH    000-02005-2   9"           SALE   Y
```

FIG. 26A

```
Report for 17-SEP-95                                          Date: 09/15/95
    Vendor, Model                                             Time: 12:43:25
                                                              Page:        1

Prem
Active   Promo
Price    Chg    Finance    Qty    Prem Desc                Cmptr
------   -----  -------    ----   ---------                -----
189.97    N
161.48    N
664.95    N
227.97    N
246.97    N
237.45    N
```

FIG. 26B

| | | | | | |
|---|---|---|---|---|---|
| 1 | RCA | E09535 X | 000*02300-8 | 9" AC/DC REMOTE | SALE | N |
| 1 | SONY | FDT5BX5 | 000*02301-0 | 5" AC/DC | SALE | Y |
| 3 | SONY | FDT5BX5W | 000-00201-6 | 5" COLOR TV | SALE | Y |
| 4 | SONY | KV9PT20 | 000-03001-5 | 9" AC/DC | REG | N |
| 1 | SONY | KV9PT40 | 000-02801-0 | 9" REMOTE | REG | Y |
| 1 | ZENI | SL0953X X | 000*02103-0 | 9"AC/DC REMOTE | SALE | Y |
| 2 | ZENI | SM0953X | 000-02102-8 | 9" AC/DC REMOTR | SALE | Y |

002 - TV 13"

| | | | | | |
|---|---|---|---|---|---|
| 1 | CRAI | P1312A | 002-01201-9 | 13" COLOR TV | SALE | Y |
| 1 | DAEW | DTQ1440FC | 002-01302-3 | 13" REMOTE | SALE | Y |
| 1 | HITA | CT1386B | X | 002*02001-6 | 13"REMOTE | SALE | Y |

CMPTB
CMPTB 256.45 N
284.99 N
284.95 N
332.47 N
312.97 N
265.95 N
265.98 N 142.49 N
151.99 N
273.55 N

| | | | | | | |
|---|---|---|---|---|---|---|
| 1 | JVC | C13CL6 | 002-01716-0 | 13" | REMOTE | SALE Y |
| 1 | JVC | C13WL6 | 002-01712-2 | 13" | REMOTE | SALE Y |
| 1 | MAGN | PR1312C | 002-01606-7 | 13" | REMOTE | SALE Y |
| 8 | MITS | CS13101 | 002*02202-2 | 13" | REMOTE | SALE Y |
| 1 | MITS | CS13201 | 002*22601-2 | 13" | STEREO | SALE Y |
| 20 | MITS | CS13RX1 X | 002*02002-8 | 13" | REMOTE | SALE Y |

\*\*\* End of Report \*\*\*

```
battag - Price Change Report
Sorted by: Major, Minor, Vendor

Market: RFD
Store :20
Major :000    - TELEVISION

Flr  Trf                                                Tag    Prc
Qty  Qty  Vend  Vsn            Sku            Desc      Type   Chg
---  ---  ----  ----           ---            ----      ----   ---

002 - TV 13"

1         MAGN  PR1312C       002-01606-7    13" REMOTE    SALE   Y

1         RCA   X13101GS      002-01805-9    13" REMOTE    REG    Y

004 - 9-20" TV/VCR COMBOS

1         DAEW  DVT1484N      002-02701-0    13" COMBO     SALE   Y

2         DAEW  DVT2084       006t03302-9    19" COMBO     REG    Y
```

FIG. 27A

| - Diff<br>Model | Active<br>Price | Promo<br>Chg | Finance | Prem<br>Qty | Prem Desc | Cmptr |
|---|---|---|---|---|---|---|
| | 155.09 | N | | | | CMPTA |
| | 138.99 | N | | | | CMPTD |
| | 299.89 | N | | | | CMPTB |
| | 329.89 | N | 10-9605 | | | CMPTB |

Date: 10/08/95
Time: 02:26:05
Page: 1

FIG. 27B

| 006 - TV 19-20" | | | | | |
|---|---|---|---|---|---|
| 1 | RCA | X19150SG | 006-02002-2 | 19" REMOTE | REG | Y |
| 1 | ZENI | SMS1917S | 006t02309-2 | 19" REMOTE | SALE | N |
| 007 - 25" and > TV/VCR COMBOS | | | | | |
| 1 | RCA | T250001GY | 008-44801-8 | 25" TV/VCR COMB | SALE | Y |
| 008 - TV 25-27" | | | | | |
| 1 | MAGN | TR2512 | 008-02803-2 | 25" REMOTE | REG | Y |
| 1 | RCA | X25103 | 008-03305-7 | 25" REMOTE | SALE | N |
| 5 | SONY | KV27S10 | 008-25108-5 | 27" STEREO | REG | N |
| 1 | ZENI | SMS2751 | 008t23507-9 | 27" STEREO | REG | Y |

FIG. 27C

| | |
|---|---|
| 179.89 N | CMPTB |
| 163.89 N | CMPTD |
| 533.45 N 10-9605 | CMPTB |
| 259.89 N | CMPTB |
| 231.79 N | CMPTD |
| 479.99 N 10-9605 | CMPTC |
| 379.89 N 10-9604 | CMPTB |

FIG. 27D

```
018 - TV 30-32"
    1    SANY  AVM3164   018-27106-5   31" PIP              REG    Y
    1    SONY  KV32S12   018-27002-5   32" STEREO, SS       SALE   Y
    1    TOSH  CX32D60   018*28201-8   32" ST, SS           SALE   Y

025 - PROJECTION TV
    1    RCA   P46725    025-21300-0   46" st pj w/pip      SALE   Y

*** End of Report ***
```

FIG. 27E

| | |
|---|---|
| 699.89 N 10-9605 | CMPTB |
| 779.95 N 10-9605 | CMPTA |
| 829.97 N | CMPTA |
| 1579.95 N 21-9702 | CMPTB |

FIG. 27F

```
                                                    cadrpt - Competitor
                                                    Sorted by: Major, Cmpt Market       : MSN
Ad Begin Date : 24-SEP-95

Major: 084   - SMALL ELECTRONICS
                Comp                                                 Active
SKU          Vend  Comp Vsn       Comp Des                           Price
-----------  ----  -----------    -----------------------            ------
094260002    RCA   RP-7926        PERS CD W/ESP                      124.99
094130007    RCA   RP-7913        PERS CD W/HP                        77.59

084115015    SHAR  WQCH800        5DISC CD CHNGR BMBX/                169.97
084210067    SHAR  WQCD66         CD-AM/FM-DBL CASS BO                 86.99

094130007    RCA   RP-7913        PERS CD W/HP                        77.59

084214053    SONY  CFD110         CD BMBX                            149.95
094011120    SONY  D242CK         PERS CD W/3SEC ESP A               149.95
085207100    SONY  WMFS395        AM/FM CASS SPORTS WA                79.95

091260009    TDK   SA90 S4        AUDIO TAPE                           7.97
```

FIG. 28A

Page: 6
Date: 05-OCT-95
Time: 08:38:48

Ad Response Report
Vend, Cmpt Vsn, SKU

| Cmpt Ad Price | Cmpt | Cmpt Vend | Cmpt Vsn | End Date | Comments |
|---|---|---|---|---|---|
| 129.99 | CMPTA | AIWA | XP55 | 30-SEP-95 | |
| 89.99 | CMPTA | MAGN | AZ6832 | 30-SEP-95 | |
| 179.99 | CMPTD | PHIL | 404K | 30-SEP-95 | |
| 89.99 | CMPTD | PHIL | 788K | 30-SEP-95 | |
| 89.99 | CMPTD | RCA | RP7914 | 30-SEP-95 | |
| 129.99 | CMPTC | SONY | CFD510 | 27-SEP-95 | |
| 149.99 | CMPTC | SONY | D247 | 24-OCT-95 | |
| 69.99 | CMPTA | SONY | WMFX393 | 30-SEP-95 | |
| 7.99 | CMPTC | TDK | SA90 5 PAC | 30-SEP-95 | |

FIG. 28B

```
084209088 SANY MCDS660    CD BOOMBOX 3 PC           119.95
084212011 SONY CFD8       CD-RADIO-CASS RECORD       79.99
084510518 SONY CFD510     3PC/SGLCASS/34T/3BAN      159.99
085202201 SONY WMFX301    AM/FM CASS WALKMAN         34.95
094011120 SONY D242CK     PERS CD W/3SEC ESP A      149.95
094081103 JVC  XLP81CR    PERS CD W/CAR ACCS/E      149.97

*** End of cadrpt Report ***
```

FIG. 28C

```
 99.99 CMPTA  ** SAME **  30-SEP-95
 89.99 CMPTB  ** SAME **  30-SEP-95
129.99 CMPTA  ** SAME **  30-SEP-95
 34.99 CMPTA  ** SAME **  30-SEP-95
149.99 CMPTA  ** SAME **  30-SEP-95
179.99 CMPTA  ** SAME **  30-SEP-95
```

FIG. 28D

```
Ad From Dt: 08-OCT-95                    addrv - Sale Ad Temporary
Ad To Date: 14-OCT-95                          Sorted by: Beg Ad Date,
From Minor: 084
To Minor  : 149

Compet
Mkt Company Mnr Sku #      Vend Vsn         Vend   Compet Vsn
--- ------- --- ---------- ---- ----------  -----  -----------
APP CMPTA   084 0841020068 GOLD TW402A      PHIL   655K
MIL CMPTA       0841020068 GOLD TW402A      PHIL   655K
MQT CMPTA       0841020068 GOLD TW402A      PHIL   655K
MSN CMPTA       0841020068 GOLD TW402A      PHIL   655K
RFD CMPTA       0841020068 GOLD TW402A      PHIL   655K

APP CMPTB   084 0840000202 SAMU PCD730      DANY   MCDS870

APP CMPTC       0840006002 CRAI JS8631/8632 RCA    RP-7935
APP CMPTD       0840006002 CRAI JS8631/8632 SAMU   RD750
APP CMPTB       0842150043 SHAR QT-CD130    SONY   CFD8
APP CMPTD       0842160019 JVC  PCX110      PANA   RXDT650
APP CMPTD       0843160009 FISH PHD650      JVC    PCXC20
APP CMPTB       0843160047 FISH PHDS55      SANY   MCDS670
```

FIG. 30A

Derivatives Report  
MNR, MKT, SKU

Page: 1  
Date: 10/08/95  
Time: 19:10:51

| Beg Ad Date | End Ad Date | Comp Price | Resp Price |
|---|---|---|---|
| 08-OCT-95 | 14-OCT-95 | 34 | |
| | 14-OCT-95 | 34 | |
| | 14-OCT-95 | 34 | |
| | 14-OCT-95 | 34 | |
| | 14-OCT-95 | 34 | |
| | 15-OCT-95 | 150 | 150 |
| | 14-OCT-95 | 69 | 60 |
| | 14-OCT-95 | 80 | 78 |
| | 15-OCT-95 | 90 | 90 |
| | 14-OCT-95 | 200 | 200 |
| | 14-OCT-95 | 250 | 199 |
| | 15-OCT-95 | 120 | 120 |

FIG. 30B

| | | | | | |
|---|---|---|---|---|---|
| MIL CMPTC | 0840066002 | CRAI | JS8631/8632 | RCA | RP-7935 |
| MIL CMPTD | 0840066002 | CRAI | JS8631/8632 | SAMU | RD750 |
| MIL CMPTD | 0842209090 | SANY | MCDZ17 | SONY | CFD21 |
| MIL CMPTD | 0842216019 | JVC | PCX110 | PANA | RXDT650 |
| MIL CMPTD | 0843316009 | FISH | PHD650 | JVC | PCXC20 |
| MQT CMPTB | 0840000202 | SAMU | PCD730 | DANY | MCDS870 |
| MQT CMPTB | 0842209088 | SANY | MCDS660 | SANY | MCDZ43 |
| MQT CMPTB | 0842215043 | SHAR | QT-CD130 | SONY | CFD8 |
| MQT CMPTB | 0843316047 | FISH | PHDS55 | SANY | MCDS670 |
| MSN CMPTB | 0840000202 | SAMU | PCD730 | DANY | MCDS870 |
| MSN CMPTD | 0840066002 | CRAI | JS8631/8632 | SAMU | RD750 |
| MSN CMPTD | 0842209088 | SANY | MCDS660 | SANY | MCDZ43 |
| MSN CMPTD | 0842209090 | SANY | MCDZ17 | SONY | CFD21 |
| MSN CMPTE | 0842212023 | SONY | CFD9 | GENE | 7052 |
| MSN CMPTB | 0842215043 | SHAR | QT-CD130 | SONY | CFD8 |
| MSN CMPTD | 0842216019 | JVC | PCX110 | PANA | RXDT650 |
| MSN CMPTD | 0843316009 | FISH | PHD650 | JVC | PCXC20 |
| MSN CMPTB | 0843316047 | FISH | PHDS55 | SANY | MCDS670 |
| RFD CMPTC | 0840066002 | CRAI | JS8631/8632 | RCA | RP-7935 |
| RFD CMPTD | 0840066002 | CRAI | JS8631/8632 | SAMU | RD750 |
| RFD CMPTF | 0840079803 | RCA | RP7987 | MAGN | AZ 3PC/REMOTE |
| RFD CMPTG | 0842201044 | MAGN | AZ9955 | MAGN | AZ9855 |

FIG. 30C

| Date | | | |
|---|---|---|---|
| 14-OCT-95 | 69 | 60 | |
| 14-OCT-95 | 80 | 78 | |
| 14-OCT-95 | 130 | 109 | |
| 14-OCT-95 | 200 | 200 | |
| 14-OCT-95 | 250 | 199 | |
| 15-OCT-95 | 150 | 150 | |
| 15-OCT-95 | 120 | 120 | |
| 15-OCT-95 | 90 | 90 | |
| 15-OCT-95 | 120 | 120 | |
| 15-OCT-95 | 150 | 150 | |
| 14-OCT-95 | 80 | 78 | |
| 15-OCT-95 | 120 | 120 | |
| 14-OCT-95 | 130 | 109 | |
| 15-OCT-95 | 100 | 100 | |
| 15-OCT-95 | 90 | 90 | |
| 14-OCT-95 | 200 | 200 | |
| 14-OCT-95 | 250 | 199 | |
| 15-OCT-95 | 120 | 120 | |
| 14-OCT-95 | 69 | 60 | |
| 14-OCT-95 | 80 | 78 | |
| 09-OCT-95 | 180 | 169 | |
| 21-OCT-95 | 200 | 198 | |

FIG. 30D

| | | | | |
|---|---|---|---|---|
| RFD | CMPTD | 0842090090 | SANY MCDZ17 | SONY CFD21 |
| RFD | CMPTF | 0842090090 | SANY MCDZ17 | SONY CFD17 |
| RFD | CMPTD | 0842160019 | JVC PCX110 | PANA RXDT650 |
| RFD | CMPTD | 0843160009 | FISH PHD650 | JVC PCXC20 |
| RFD | CMPTF | 0843160009 | FISH PHD650 | SONY CFD606 |
| RFD | CMPTF | 0849350001 | RCA RP7935 | MAGN AZ8006 |
| APP | CMPTH | 085 085106005 | GRAN C3201 | GENE 3-5468 |
| APP | CMPTD | 0852022225 | SONY WMFX303 | SONY WMFX315 |
| MIL | CMPTD | 0852022225 | SONY WMFX303 | SONY WMFX315 |
| MSN | CMPTH | 085106005 | GRAN C3201 | GENE 3-5468 |

** END OF ADDRV REPORT **

FIG. 30E

| 14-OCT-95 | 130 | 109 |
| 09-OCT-95 | 120 | 109 |
| 14-OCT-95 | 200 | 200 |
| 14-OCT-95 | 250 | 199 |
| 09-OCT-95 | 230 | 199 |
| 09-OCT-95 | 75 | 74 |
| 15-OCT-95 | 15 | 15 |
| 14-OCT-95 | 40 | 40 |
| 14-OCT-95 | 40 | 40 |
| 15-OCT-95 | 15 | 15 |

FIG. 30F

ADSKU - Advertised SKU Maintenance                                          Date: 05-OCT-95

| | | ---- Ad Dates ---- | ---- Sku Range ---- |
|---|---|---|---|
| | Mkt | Begin | End | Begin | End |
| | ALL | 17-SEP-95 | 23-SEP-95 | | |

| Sku Typ | Sku | --- Ad Dates --- Begin | End | Ad Price | -- Qty -- Adv | Res | ---- Reserved ---- Begin | End | |
|---|---|---|---|---|---|---|---|---|---|
| ADV | 035026017 | 10-SEP-95 | 16-SEP-95 | 249.00 | 40 | | 30-AUG-95 | 09-SEP-95 | |
| | | | | | | | 0830517AD00 | | LCH |
| ALT | 036224056 | 10-SEP-95 | 16-SEP-95 | 299.97 | | 0 | | | LCH |
| ALT | 036224068 | 10-SEP-95 | 16-SEP-95 | 349.97 | | 0 | | | LCH |
| ALT | 036229018 | 10-SEP-95 | 16-SEP-95 | 369.98 | | 0 | | | LCH |
| ADV | 036225046 | 10-SEP-95 | 16-SEP-95 | 359.00 | | | | | LCH |
| no_pay/int_197 | | | | | | | | | |
| ADV | 036229044 | 10-SEP-95 | 16-SEP-95 | 299.00 | 40 | | 29-AUG-95 | 09-SEP-95 | |
| no_pay/int_197 | | | | | | | 0829517AD04 | | LCH |

Vend/Model: SONY SLV640HF

Count: 85

FIG. 31

COMP - Price Competitor Maintenance

| | Company | Description |
|---|---|---|
| | CMPTA | COMPETITOR A |

| ATV Mkt | Store Loc | Location Desc | Price Days |
|---|---|---|---|
| APP | HWY10 | FOX_RIVER_MALL | 7 |
| MIL | BROOK | BROOKFIELD | 8 |
| MIL | NRIDG | NORTHRIDGE | 8 |
| MIL | RACIN | RACINE | 8 |
| MIL | SRIDG | SOUTHRIDGE | 8 |
| MSN | EAST | East_Towne | 8 |
| MSN | WEST | West_Towne | 8 |
| RFD | ROCKF | ROCKFORD | 8 |

Count: *1

FIG. 32

CPTMAT - COMPETITOR SKU MATCH-UP SCREEN

Sku Range: 000000000 To 999999999         Vendor Range: AAAA To ZZZZ

Mnr Range:    000    To 010               Competitor:  CMPTA   COMPETITOR A

Markets:   APP MIL                        De(R)ivative or
                                          De(S)elect?  S
Include Drops?  N

| Sku #      | Style | Mkt | Loc   | Comp Vend | Company Vsn | Cmpt Vend | Compet Vsn | De-Sel |
|------------|-------|-----|-------|-----------|-------------|-----------|------------|--------|
| 0082370l1  | GOOD  | MIL | BROOK | MAGN      | TP2782      |           |            |        |
| 0082370l1  | GOOD  | MIL | NRIDG | MAGN      | TP2782      |           |            |        |
| 0082370l1  | GOOD  | MIL | SRIDG | MAGN      | TP2782      |           |            |        |
| 0082370l1  | GOOD  | APP | HWY10 | MAGN      | TP2782      |           |            |        |
| 0082370l1  | GOOD  | MIL | RACIN | MAGN      | TP2782      |           |            |        |
| 0080280020 | GOOD  | MIL | BROOK | MAGN      | TR2510      | MAGN      | 25TRC10    | X      |
| 0080280020 | GOOD  | APP | HWY10 | MAGN      | TR2510      | MAGN      | 25TRC10    | X      |
| 0080280020 | GOOD  | MIL | SRIDG | MAGN      | TR2510      | MAGN      | 25TRC10    |        |
| 0080280020 | GOOD  | MIL | RACIN | MAGN      | TR2510      | MAGN      | 25TRC10    |        |
| 0080280020 | GOOD  | MIL | NRIDG | MAGN      | TR2510      | MAGN      | 25TRC10    | X      |

Count: *0

FIG. 33

Start Vendor: A
End Vendor  : ZZZZ
Start Minor : 000
End Minor   : 010 drvrpt - Derivative
Sorted by: Comp Vend

| SKU # | Comp Vend | Company Vsn | Mkt | Company | Compet Vend | Compet Vsn | Shop |
|---|---|---|---|---|---|---|---|
| 002017209 | MAGN | PR1310   | APP | CMPTA | MAGN | 13PRC10 | NO |
| 002017209 | MAGN | PR1310   | APP | CMPTB | MAGN | PR1310  | NO |
| 002017209 | MAGN | PR1310   | APP | CMPTC | MAGN | 13PRC10 | NO |
| 002017209 | MAGN | PR1310   | MIL | CMPTD | MAGN | 13PRC10 |    |
| 002017209 | MAGN | PR1310   | MSN | CMPTD | MAGN | 13PRC10 | NO |
| 002017209 | MAGN | PR1310   | RFD | CMPTD | MAGN | 13PRC10 | NO |
| 002017209 | MAGN | PR1312C  | APP | CMPTD | MAGN | PR1395  |    |
| 002016067 | MAGN | PR1312C  | MIL | CMPTD | MAGN | PR1395  |    |
| 002016067 | MAGN | PR1312C  | MSN | CMPTD | MAGN | PR1395  |    |
| 002016067 | MAGN | PR1312C  | RFD | CMPTD | MAGN | PR1395  |    |
| 006020010 | MAGN | PR1910   | APP | CMPTD | MAGN | 19PRC12 | NO |
| 006020010 | MAGN | PR1910   | APP | CMPTB | MAGN | PR1910  | NO |
| 006020010 | MAGN | PR1910   | APP | CMPTE | MAGN | 19PRC10 | NO |
| 006020010 | MAGN | PR1910   | MIL | CMPTD | MAGN | 19PRC12 |    |

FIG. 34A

Alignment Report
/ Comp Vsn / Mkt

Page: 3
Date: 11-OCT-95
Time: 12:57:59

FIG. 34B

| | | | | | | | |
|---|---|---|---|---|---|---|---|
| 006020010 | MAGN | PR1910 | | MSN | CMPTD | MAGN | 19PRC12 | NO |
| 006020010 | MAGN | PR1910 | | MSN | CMPTF | MAGN | PR1910 | NO |
| 006020010 | MAGN | PR1910 | | RFD | CMPTD | MAGN | 19PRC12 | NO |
| 006020010 | MAGN | PR1910 | | RFD | CMPTG | SHAR | 19FM50 | NO |
| 008033045 | MAGN | RR2741 | X | APP | CMPTD | MAGN | TR2710 | NO |
| 008033045 | MAGN | RR2741 | X | MIL | CMPTD | MAGN | TR2710 | |
| 008033045 | MAGN | RR2741 | X | MSN | CMPTD | MAGN | TR2710 | NO |
| 008033045 | MAGN | RR2741 | X | RFD | CMPTD | MAGN | TR2710 | NO |
| 008238037 | MAGN | TP2770 | | APP | CMPTB | MAGN | TP2770 | NO |
| 008238037 | MAGN | TP2770 | | MIL | CMPTH | MAGN | TP2770 | |
| | | | | | | | | |
| 002022022 | MITS | CS13101 | | MSN | CMPTD | SONY | 12345 | NO |
| 006027014 | MITS | CS20101 | | MIL | CMPTH | MITS | CS20101 | NO |
| 006236017 | MITS | CS20301 | | MQT | CMPTI | MITS | CS20301 | NO |
| 006247010 | MITS | CS26301 | | MQT | CMPTI | MITS | CS26301 | NO |
| 008251035 | MITS | CS27303 | | MQT | CMPTI | MITS | CS27303 | |
| 008258039 | MITS | CS27405 | | | | MITS | CS27405 | |
| | | | | | | | | |
| 008254081 | PANA | CT27SF11 | | APP | CMPTJ | PANA | CT27SF11 | NO |
| 008266012 | PANA | CT27SF31 | | APP | CMPTD | PANA | CT2753 | NO |
| 004243010 | PANA | PVM2045 | | APP | CMPTD | PANA | PVM2035 | |
| 004243010 | PANA | PVM2045 | | MIL | CMPTD | PANA | PVM2035 | |

FIG. 34C

| | | | | | | |
|---|---|---|---|---|---|---|
| 002016043 | PHLP | 13P220 | APP | CMPTC | MAGN | RR1390 | NO |
| 008234053 | PHLP | 27T500C | MQT | CMPTK | PHLP | 27TP500 | NO |
| 000020014 | QUAS | TP1015 | APP | CMPTD | PANA | CT10R11 | NO |
| 000020014 | QUAS | TP1015 | MIL | CMPTD | PANA | CT10R11 | |
| 000020014 | QUAS | TP1015 | MSN | CMPTD | NANA | CT10R11 | NO |
| 000020014 | QUAS | TP1015 | RFD | CMPTD | PANA | CT10R11 | NO |
| 000021105 | QUAS | TP1016 | APP | CMPTD | PANA | CT10R11 | NO |
| 000021105 | QUAS | TP1016 | APP | CMPTB | PANA | CT10R11 | NO |

* End of drvrpt Report *

FIG. 34D

```
IMMCM Item-Master/Comment Maintenance      Page 1 of 1        Date: 11-OCT-95
+------------------------------------------------------------------------+
| SKU Number     : 250350508   UPC:                    Freight Factor     : |
| Minor Code     : 250        Drop Dt:                 Last Receive Date  : |
| Category Code  : 250        Transition Dt:           First Receive Date : |
| Style  Code    : BETTR      Creation Dt:             SER Percent        :           50 |
| Family Code    : 35050      Sort Type:               GPS Percent        :            2 |
| Vendor Code    : HOTP - HOT POINT                    PTAG Print Qty     : |
| Vendor Stock # : WLW3310RWH                          Ret Prc Chng Date  : |
| Item Type Code : INV - Regular_Inventory             Last Active Date   : |
| Size           :           Cover :                   Invoice Cost       :       265.00 |
| Finish         : WHITE     Grade:                    PO FIFO Cost       :       265.00 |
| Description    : WASHER                              Spiff Amount       : |
| Prod Avail Cd  :           Min Price:                Retail Price       :       359.95 |
| Measure Code   :           Label Type:         B WHS Replacement Cost   :       275.00 |
| Carpet Width   :    0      RCV Label Code: |         Advertised Price   : |
| Pallet Qty     :           DLYMKT Flag:              Commission Code    : A |
| Weight         :                    Taxable:         Warrantable        : Y Days |
| Volume         :    25  Sell Individual: Y           Treatable : N         Inv : Y |
+------------------------------------------------------------------------+
 |ALL                                        ------- Comments -----------

Count: *1
```

FIG. 35

Cent Code Table

| Marketing Type | Cent Code |
|---|---|
| Select type from menu. Options are: Good, Better, Best and Focus | This is a one-digit code ranging from 0 to 9. |
| GOOD | 9 |
| BETTER | 5 |
| BEST | 7 |
| FOCUS | 8 |

FIG. 36

SYSTEM AND METHOD FOR AUTOMATIC UPDATING AND DISPLAY OF RETAIL PRICES

TECHNICAL FIELD

This invention relates generally to an automated system for pricing and repricing goods (or services) responsive to market price changes and relates, in particular, to a computerized system and apparatus for implementing complex pricing standards for the goods (or services). The invention is particularly well-suited as a retail pricing system, which provides, among other features, purchasing assistance to a buyer by supplying comparison pricing of goods by competitors.

BACKGROUND OF THE INVENTION

The tremendous number of product types available to consumers at the retail level, e.g., in food and grocery, personal care, hardware and appliances, means that a retailer may have thousands of models or varieties of goods in inventory, each, of course, with a concomitant price. The result of this multitude of consumer products is that the control and consistency of pricing has assumed increasing importance, especially where retailing is highly competitive and price management is essential for a merchant to keep pace with competitors.

One area that has produced such a multitude of products and that has become a highly competitive selling environment is consumer appliances and electronics. Each type of product, e.g., a television set, is typically available from several different manufacturers, and each manufacturer typically produces several models of the same type product. The prices of products vary from manufacturer to manufacturer as well as within the same manufacturer's range of models, depending upon the particular specifications and features of each model within the product type. Moreover, each manufacturer sells its products through a large number of distributors and, ultimately, to retail stores, with the result that the pricing of the same product can differ from distributor to distributor, from retailer to retailer and from geographic market to geographic market. Even within a single merchant's inventory, price variations on an individual product occur, e.g., an advertised special versus the "regular" price.

To keep pace with competitors, a merchant may obtain pricing information by reviewing competitors' advertisements, printed or otherwise, by actual shopping of competitors and viewing of price tags in a competitor's store or outlet, or from a customer at the point of sale who claims that a certain product can be purchased from a competitor for a certain (i.e., lower) price. "Sale" prices are particularly problematic as such prices are typically only valid for a defined period, after which the "sale" price reverts to the "regular" price. If a merchant wishes to change prices in response to a competitor's price, usually special effort is required to change price tags at points of sale to meet or "beat" the competitor's price. The manual nature of the process does not permit prices to change frequently, such as once or twice per day. Such frequency is prohibitive, and thus, a merchant cannot respond daily to market price changes involving hundreds to thousands of products. Moreover, keeping track of the valid period for "sale" prices adds yet another layer of complexity. Further, if a competitor's pricing becomes known at the point of sale, the salesperson must determine if he or she is willing to sell the product for a lower or the same price, (i.e., in accordance with the merchant's pricing policy). In the latter situation, one customer may purchase a product at one price while the next customer at another price. Such a system leads to uncertainty in pricing.

Various pricing systems are known, although virtually none implement complex pricing policies. Many systems, especially in the stock brokerage area, will provide market pricing of stocks. See, e.g., U.S. Pat. No. 5,313,560 issued to Maruoka et al. Maruoka et al. disclose a system for predicting the price fluctuations of stocks and bonds according to certain established rules which establish certain conditions. If certain conditions for price of a stock or bond are met, the system then displays a message to perform a certain activity, e.g., buy or sell. Other patents (e.g., U.S. Pat. No. 5,347,452 issued to Bay, Jr., U.S. Pat. No. 5,339,392 issued to Risberg et al., U.S. Pat. No. 5,297,032 issued to Trojan et al., U.S. Pat. No. 5,270,922 issued to Higgins, U.S. Pat. No. 5,132,899 issued to Fox, U.S. Pat. No. 4,942,616 issued to Linstroth et al., U.S. Pat. No. 4,486,853 issued to Parsons, and U.S. Pat. No. 1,927,702 issued to Foss) are directed to variations of stock quotation systems that provide a user with updated stock prices in a continually changing market of prices. While these systems can accommodate a continually changing price situation, the actual pricing, of course, is independent of the system, i.e., pricing is controlled by the stock market.

Other systems provide pricing as part of a broader system for sale of a product, for example, the sale of an insurance product. See, e.g., U.S. Pat. No. 5,191,522 issued to Bosco et al. A few systems have addressed retail pricing; for example, U.S. Pat. No. 4,992,940 issued to Dworkin. The Dworkin patent discloses a competitor price comparison feature in an automated purchasing system in which the user can compare prices of various vendors for the same product and select the "best price." Also, U.S. Pat. No. 5,172,314 issued to Poland et al. discloses a price updating system which includes electronic "price tags." The prices are updated by management, but no system or logic is disclosed for the pricing changes. Still other patents directed to pricing functions include U.S. Pat. No. 5,117,354 issued to Long et al. and Japanese Patent 58-161067. Further, others are directed to automated costing and selling systems (e.g., U.S. Pat. No. 5,249,120 issued to Foley, U.S. Pat. No. 5,063,506 issued to Brockwell et al., U.S. Pat. No. 3,581,072 issued to Nymeyer). Also known are hand-held shoppers calculators (e.g., U.S. Pat. No. 4,446,528 issued to Marmon, U.S. Pat. No. 4,528,638 issued to Hatta et al.) and bar-code type identification for automated pricing (U.S. Pat. No. 3,637,989 issued to Howard et al.). U.S. Pat. No. 5,212,644 issued to Frisch describes a system for changing the rental fees of lockers according to certain rules.

There appear to be some commercially available pricing systems. For example, DB:Solutions, Inc. of Kentfield, Calif., provides a software program which is advertised as a retail management system with a price-change management feature. Data Index, Inc. of Dallas, Tex., provides a software program which is said to target gross margins for products and reprice products as vendor or manufacturer prices changes. None of these systems provides a method for implementing pricing policies and integrating such policies with price comparisons among competitors.

Despite the known pricing and selling systems, there is needed a system that automatically and frequently prices and reprices a plurality of products in inventory, responsive to competitive market price changes, permits and tracks price exceptions, financing terms and premium offers associated with product price and sale price effective dates, but also provides point of sale assistance to buyers with price comparison among competitors on the product of interest or a substantially similar competitor product.

SUMMARY OF THE INVENTION

The present invention provides an automated system and apparatus which not only permits a seller or merchant, e.g., a retailer, to manage complex pricing standards for a plurality of goods (or services) but also provides a buyer at the point of sale with price comparisons among competitors to ascertain the best price available for a product or a substantially similar product. Specifically, the invention provides a system comprising an integrated price information processing and reporting system which includes a relational database established at the onset, and encompassing all of the price data requirements of the seller or system user, i.e., owner of the system in accordance with the present invention.

In a specific embodiment, the invention provides a system of processing automated pricing of retail goods and merchandise responsive to market price changes. The invention provides an enterprise-wide (e.g., a retailer with many locations in many market areas) data structure and database for an integrated retail price information storage, processing and reporting system. That is, the database of the system stores and maintains prices on a plurality of goods in a plurality of markets for the system user and a plurality of competitors.

The hardware for the system comprises in combination, a storage device for storing retail price data in the enterprise-wide data structure format, a memory medium and a central processing unit. The data structure and data requirements for the system user selling a plurality of goods are identified and documented in table format and entered into tables of the database in the computer storage device. The database in accordance with the present invention is suitably a relational database. The tables of the database are in the format of rows and columns. Since the database is relational, each of its tables will have a column that is the same as a column of at least one other table.

The system also contains a stored program-controlled application for pricing and repricing product items responsive to market price changes on a product-by-product and market-by-market basis. That is, as data records in the tables regarding system company prices and competitor prices are updated, a pricing software program is invoked which automatically reprices items in accordance with a predetermined pricing standard or rules.

Thus, the system of the present invention is also a computerized price control system for implementing pricing standards/policies. In a preferred embodiment, the pricing policies are directed to having the lowest price for any particular item or a substantially similar item in a particular market. In addition, the pricing system allows for display on the sales floor of current valid price comparisons to demonstrate the lowest price on a particular item in the market in which a buyer is shopping.

Specifically, the price-changing function of the system is responsive to competitive price data on identical or substantially similar products in multiple geographic markets for multiple competitors. The database of the system includes indicia for each item sold, including a product identification number, e.g., a stock keeping unit or SKU, the market in which it is sold, the price, value added characteristics, e.g., special financing arrangements or premiums offered, and market type which relates to profit margin. The pricing software defines an active price (i.e., the real-time current valid price) for every item; the active price is a function of a regular price (i.e., cost plus usual system user's markup), an advertised price (if the item is an advertised special), a sale price (if the item is a sale item with a percent off or dollars off the regular price), and competitors' prices for the identical or substantially similar item.

In overall operation, the system receives competitor price data for items, compares the competitors' prices with the active price, and automatically changes the active price in accordance with certain rules depending on whether the competitor's price is an advertised price, a nonadvertised price or a value-added price. The system stores beginning and ending dates for "sale" prices and other promotion and automatically deletes any expired price from the normal pricing table. Product and price data are input daily and prices change, as necessary, up to twice per day, but other frequencies are possible. In addition, the system provides for price override (e.g., for an employee discount price) which when entered into the system neither triggers nor prevents automatic change based on other data.

In a further aspect, the system in accordance with the present invention includes a sales subsystem, a merchandising subsystem and a marketing subsystem. The sales subsystem functions to process sales information which includes accessing pricing data in the database on a product-by-product basis and a market-by-market basis, and capturing from the database and displaying a comparative price set of updated pricing data and competitors' prices for a selected product for a selected market to a buyer at a point of sale.

The merchandising subsystem functions to process merchandising information which includes accessing updated pricing data in the database on a product-by-product basis and a market-by-market basis, maintaining and updating information on competitor's shopped prices and advertised prices, and determining user's advertisement response price responsive to competitives advertised prices.

The marketing subsystem functions to process marketing information which includes accessing updated pricing data in the database on a product-by-product basis and a market-by-market basis, creating, storing and maintaining information on all existing and new products of user and products of competitors, including creating, storing and maintaining a user's regular price for each product of the plurality of products, creating, storing and maintaining a user's advertised price as needed for each product of the plurality of products, for creating, storing and maintaining competitors and products thereof to be shopped, and creating, storing and maintaining competitors' derivative models, i.e., models substantially similar to a product sold by the user.

The system can optionally generate price tags to accommodate price changes.

As a databased system, the invention generates a variety of forms and reports including an active price list, and a comparative price screen, available at the point-of-sale, indicating the active price, the competitors' prices for the particular item and when the last shopping occurred (i.e., how recent the data are).

Other advantages and a fuller appreciation of the specific attributes of this invention will be gained upon an examination of the following drawings, detailed description of preferred embodiments, and appended claims. It is expressly understood that the drawings are for the purpose of illustration and description only, and are not intended as a definition of the limits of the invention.

BRIEF DESCRIPTION OF THE DRAWINGS

The preferred exemplary embodiment of the present invention will hereinafter be described in conjunction with the appended drawing wherein like designations refer to like elements throughout and in which:

FIG. 3 is a sample table format into which data is entered into the system relational database;

FIG. 4 illustrates an ITEM table of the system database;

FIG. 8 illustrates a competitor price information screen (CPTPRC);

FIG. 15 is a sample of the Price Exception Detail report (PEXDET);

FIG. 18 is a flowchart illustrating the utilization of the system in accordance with the present invention by Merchandising.

FIG. 19 is a sample of the Competitor Ad Response Entry screen (CPTAD);

FIG. 18 is a sample of the Competitor Shopping Entry screen (CPTSHP);

FIG. 19 is a sample of the Last Shopped Query screen (LSTSHP);

FIG. 20 is a sample of the Active Price Listing report (PRCLST);

FIG. 21 is a sample of the Item Price Query screen (PRICES);

FIG. 22 is a sample of the Competitive Shopping report (SHPRPT);

FIG. 23 is a sample of the Value Added Table Maintenance screen (VALADD);

FIG. 24 is a sample of the Price Change Flash report (FLARPT);

FIG. 25 is a sample of the Price Change report (BATRPT);

FIG. 26 is a sample of the Future Price Change report (FUTTAG);

FIG. 27 is a sample of the Price Change Difference report (BATTAG);

FIG. 28 is a sample of the Competitor Ad Response report (CADRPT);

FIG. 30 is a sample of the Sales Ad Temporary Derivative report (ADDRV);

FIG. 31 is a sample of the Advertised SKU Maintenance screen (ADSKU);

FIG. 32 is a sample of the Price Competitor Maintenance screen (COMP);

FIG. 33 is a sample of the Competitor SKU Match-up screen (CPTMAT);

FIG. 34 is a sample of the Derivative Alignment report (DRVRPT);

FIG. 35 is a sample of the Item Master/Comment Maintenance screen (IMMCM).

FIG. 36 is a sample of the CENT CODE table.

DETAILED DESCRIPTION

Figure 1:
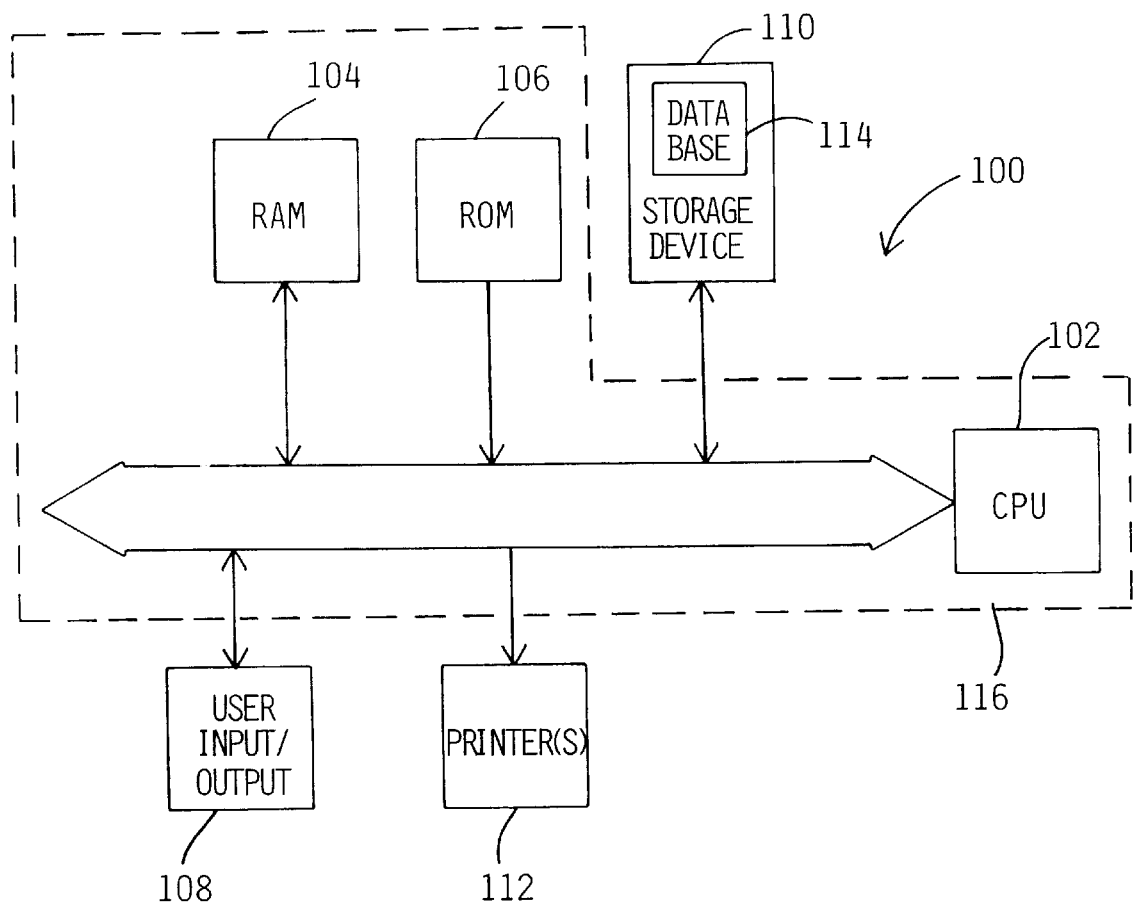
FIG. 1 is a schematic diagram of exemplary hardware suitable for the system of the present invention.

The present invention relates broadly to an automated system for pricing and repricing goods or services responsive to certain market changes. However, the system of the present invention is particularly well adapted for use in retail merchandising in which specific pricing standards are applied to a plurality of goods in a plurality of markets. Accordingly, the present invention will now be described in detail with respect to such endeavors; however, those skilled in the art will appreciate that such a description of the invention is meant to be exemplary only and should not be viewed as limitative on the full scope thereof.

The present invention is characterized by an ability to automatically implement price responses to market changes, on a product-by-product, market-by-market basis. In a preferred embodiment, the pricing response is directed to having the lowest price for any particular product based on price comparisons on the same or a substantially similar product sold by competitors in a specific geographic market. The number of markets that can be accommodated by the system of the present invention is not limited. In a preferred embodiment of the system, there are five different geographic markets. The system is suitably an enterprise-wide (i.e., a multi-market, multi-facility, e.g., store) system and price changes are directed on a market-by-market basis. In a preferred embodiment, the number of products whose data records are held in the database may exceed 10,000. The number of competitor shopped items may exceed 5000.

As used herein, the terms "merchant," "seller," "user," or "enterprise" are all meant to refer to the system user, whose prices are compared to competitors' prices. The term "company" may mean either the system user or competitor, depending upon the context. The terms "regular price" or "REG price" mean the system user's retail price of an item not subject to special pricing such as discount, sale or advertised special. The terms "active price" or "ACT price" refer to the current system user's valid price of an item which may be a discounted or advertised special price. The terms "competitor's shopped price" or "shopped price" or "COMPTR price" refer to a competitor's price, that is, the price on the competitor's price tag on an item. The term "advertised price" or "ADV price" in connection with the system user or a competitor refers to a price for an item described or shown in an advertisement, written or otherwise, usually valid for a prescribed time period. The terms "ad response price" or "ADRESP price" refer to the system user's price in response to a competitor's advertised price. The terms "sale price" or "SALE price" refer to the system user's sale price. The terms "value added price" or "VALADD price" refer to a price for an item which includes a special offer such as special financing or installation, etc.

The term "derivative model" refers to a model of an item sold by a competitor which has similar but not identical features and specifications as an item sold by the system company. The term "SKU" which stands for "stock keeping unit" herein, and in the retail trade generally, refers to the system user's item identification code, i.e., each model of a product has the system user's unique SKU.

The invention is an integrated pricing information storage, processing and reporting system based upon a single enterprise-wide relational database of product/price information and a pricing software program. The pricing program interacts within the integrated system by processing price data from the enterprise-wide relational database. The enterprise-wide relational database is stored in a storage device, and includes, among other data records, for each product, a product identification number, e.g., a SKU, and an active price on a market-by-market basis. At a predetermined frequency, e.g, twice daily, the pricing program reprices each product responsive to the lowest updated competitor's price in a specific geographic market for the product to provide an updated active price.

Figure 2:
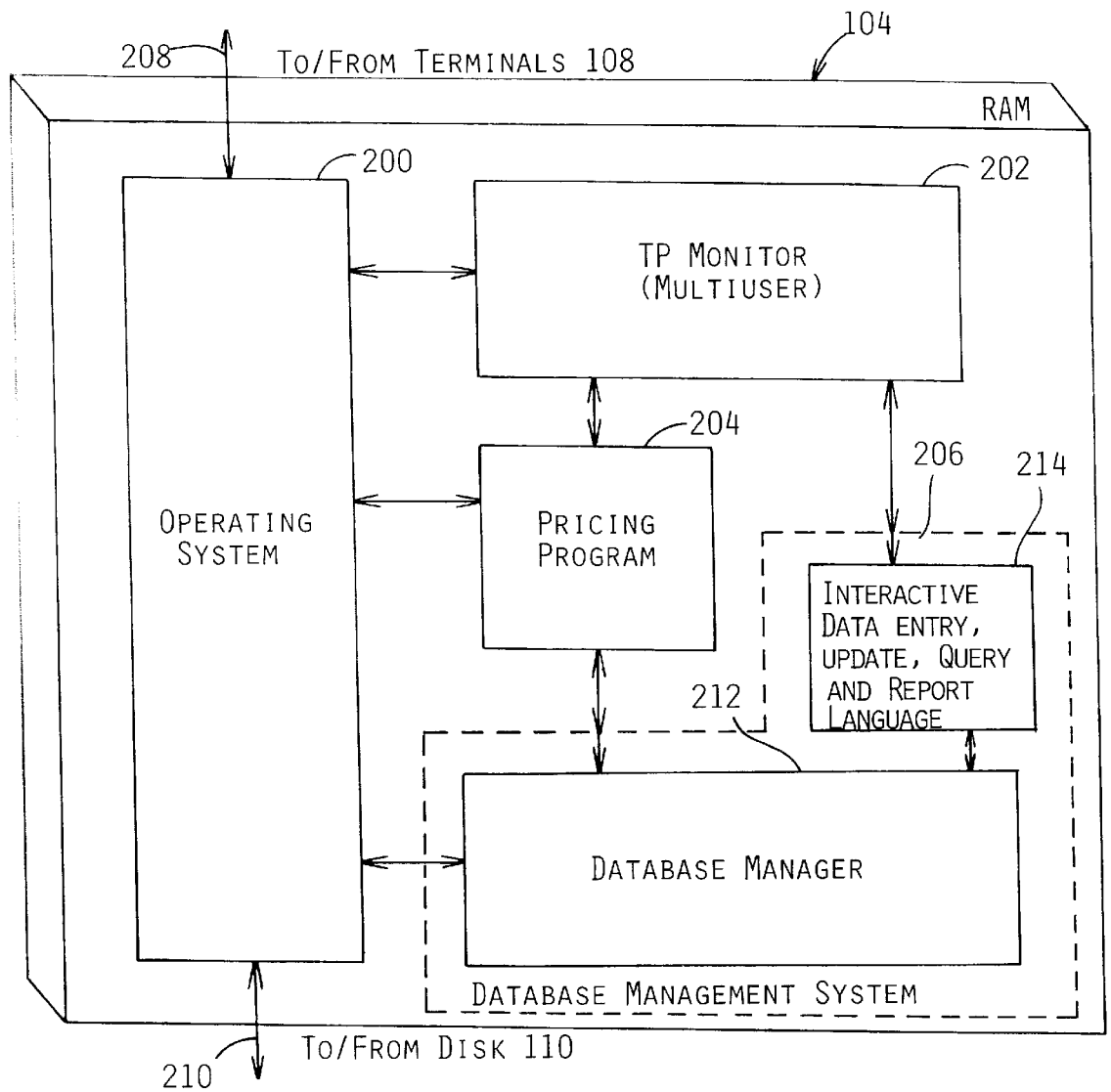
FIG. 2 is a schematic diagram representing the operation of the RAM in accordance with the present invention.

Reference is now made to FIGS. 1 and 2, wherein the hardware and software components of the system 100 in accordance with the present invention are depicted. The hardware of the system 100 includes a central processing unit 102, a random access memory (RAM) 104, a read only memory (ROM) 106, storage devices, e.g., a hard disk 110, including a database 114 stored therein and user input/output devices, i.e., terminals 108. Reference numeral 116 refers to a computer 116 which includes RAM 104, ROM 106 and CPU 102. The system also optionally has one or more printers 112. Such a system is suitably a Sequent S2000/750, manufactured by Sequent Computer Systems of Beaverton, Oreg., with the user terminals networked to the computer via a Xyplex network, manufactured by Xyplex, Inc. of Littleton, Mass., using telephone lines for remote terminals, i.e., terminals in stores or outlets remote from the computer. The Sequent S2000/750 includes a 576 M RAM, a 58G hard disk and eleven Intel 486 processors as a CPU.

FIG. 2 shows schematically the organization of RAM 104 which includes an operating system 200, a teleprocessing (TP) multi-user monitor 202, a pricing program 204, a database management system 206 that manages the transfer of data between multiple local and remote terminals. Reference numerals 208 and 210 refer to communicating access connections to terminals 108 and storage devices, i.e., hard disk, 110, respectively. Database management system 206 includes a database manager 212 and an interactive query/update language component 214 wherein a user can query and update data records in the database 114. In a preferred embodiment, the pricing program 204 is written in the "C" programming language. The TP monitor is a network communications control program that manages the transfer of data between multiple local and remote terminals and the application programs that serve them.

A feature of the present invention system is that the database is accessible by remote terminals in all geographic markets in which the user sells and in all the user's facilities. It is not limited in any way by geographic location.

As is known in the art, a relational database is a database in which sets of related data are treated logically as if they were contained in two-dimensional tables in which each data record of the set appears as a row and attributes or fields of the items are arranged as columns. Since database is relational, each of its tables will have a column that is the same as a column of at least one other table. The tables are created by a relational database management system ("RDBMS") program. A sample table 216 is illustrated in FIG. 3, and an ITEM table 218 utilized and explained in detail hereinafter is illustrated in FIG. 4. The pricing program 204, stored in the system, accepts and processes data contained in one or more of the separate tables of the relational database. This unique data structure composed of relational tables allows the system to operate very efficiently while at the same time allowing for the implementation of security measures which restrict access of certain system users to particular data and tables.

Each model of a product in the system user's inventory regardless of database organization, is characterized in the database, by certain parameters (attributes or fields). Each product is assigned a unique product identification number which is used to identify it from other items in the database. Each product may also have one or more parameters which are used, for example, to group the product into one or more product groups or describe features of the product. In a preferred embodiment of the invention, the parameters for each product in the system user's inventory suitably includes, without limitation, a unique SKU, a product description, a vendor name and a vendor's model number. The product description suitably includes a major description and a minor description, for example, for a television set, the major/minor description may be "television/20 in. remote."

The database tables in accordance with the present invention include, without limitation, an ITEM table, an ITEM PRICE table, an ADVERTISED SKU table, an AD RESPONSE table, a CENT CODE table, a COMPETITOR table, a COMPETITOR LOCATION table, a COMPETITOR SHOPPED-ITEMS table, an ITEM DERIVATIVE table, a PRICE CHANGE table, a VALUE ADDED ITEM table, and a REASON table.

The ITEM table contains a row for every product in the system user's inventory, and establishes the relationship between item and SKU. The ITEM table stores for each item, a SKU, a product description, a vendor and vendor's model number, as seen in FIG. 4. The ITEM PRICE table stores prices for each item based on market and price type (i.e., REG, ADV, SALE, etc. price) and includes fields that hold the SKU, market, price, price effective date, price end date, company, company location and price type.

The ADVERTISED SKU table establishes the relationship between the SKU, ad price, advertisement effective and end dates and one or more alternative model SKU. The alternative models are of the same product type as the advertised item, but may have more features. Alternative models also have an ad price controlled by the effective and end dates of the ad. The AD RESPONSE table stores items that have a price change due to a competitor's sale ad, and establishes the relationship between SKU, competitor's ad price and the system user ADRESP price; the CENT CODE table stores the final cent price of an item based on marketing, i.e., it establishes the relationship between cent code and marketing type. As explained in detail hereinafter, the marketing type, i.e., good, better, etc., refers to the profit margins associated with the item.

The COMPETITOR and COMPETITOR LOCATION tables contain the identification and location information about competitors as well as the system user. New competitors can be added as desired, as described hereinafter. The COMPETITOR SHOPPED-ITEMS table captures data regarding prices per product per competitor per market, i.e., products and price information are tracked for competitors.

The COMPETITOR SHOPPED-ITEMS table stores the items that were shopped and their prices, and includes fields that hold the shopped price of the item and the date the shopping information was updated. The ITEM DERIVATIVE table stores the permanent competitor derivative model information. By establishing data records on derivative models, the system permits price comparisons with models of product that are not identical to the corresponding system user's model. As such, price comparisons for a buyer extend far beyond only those models which the system user sells.

The PRICE CHANGE table stores price change and the reasons for such changes. This table includes fields for SKU, price type (i.e., REG, SALE, etc.) competitor name, competitor location, old price and new price.

The REASON table stores price change reasons and has fields for a price reason code and description of the price change reason (e.g., CPTPR for competitor price). The VALUE ADDED ITEM table is used to store value added promotion information and includes fields that hold descriptions of the nature of the value added promotion to the item (e.g., percentage off the regular price of the item; premium item associated with the item; financing promotion associated with the item, etc.).

The RDBMS program is used to manage the database in accordance with the present invention. The RDBMS program preferably uses a Structured Query Language ("SQL"), a fourth generation IBM computer language. To implement a preferred embodiment of the system in accordance with the present invention, a software package such as the RDBMS produced by Oracle Corporation of Belmont, Calif., e.g., ORACLE Version 7.1.6, is suitably used, although any other RDBMS may also be used in the invention. In the preferred embodiment, the system in accordance with the present invention utilizes the SQL*PLUS®, a registered trademark of Oracle Corporation, a programming tool for creating, modifying, storing and maintaining the database; SQL*FORMS®, a registered trademark of Oracle Corporation, a tool for designing screens; and PRO*C Precompiler, a programming tool that allows embedded SQL statements in a high-level source program.

The system in accordance with the present invention has, without limitation, three users-sales, merchandising and marketing. The user interfaces with the system include various forms and reports. A form is a stylized format used to prompt data entry or display database contents on the screen. A report is a customized printed output for summarizing and aggregating data contained in the database. Each form, i.e., screen, addresses a different function through which data can be entered and updated and/or the database queried. Some screens are query-only screens; others are update screens, i.e., data records in the database are updated. Each screen prompts or lists for the user the input data necessary for the query or update. The screens are formed and formatted utilizing the database forms tool, e.g., SQL*FORMS in the ORACLE™ RDBMS. Reports are formed and formatted utilizing, e.g., SQL*PLUS in the ORACLE™ RDBMS. The screens, i.e., forms and reports, provide information in categories corresponding to the primary user categories; namely, sales information, merchandising information and marketing information. The specific screens and reports are described in detail hereinafter.

As described above, the database has at least three users, sales, marketing and merchandising. Marketing has full update and access rights to the ITEM, ADVERTISED SKU, AD RESPONSE, COMPETITOR SHOPPED-ITEMS, ITEM DERIVATIVE, AND VALUE ADDED ITEMS tables, while merchandising has full update and access rights to the AD RESPONSE, COMPETITOR, COMPETITOR LOCATION, and COMPETITOR SHOPPED-ITEMS tables. Sales has access, i.e., connect, rights only to the tables except for the PRICE CHANGE table which records price exceptions. A price exception may include an employee or family discount price or a floor sample, e.g., "demo" model, price. Such prices while maintained in the database 114 may not effect the pricing and repricing accomplished by the pricing program 204. Thus, sales has the ability to browse through information in the database, but cannot add or alter any information except for the PRICE CHANGE table.

Figure 5:
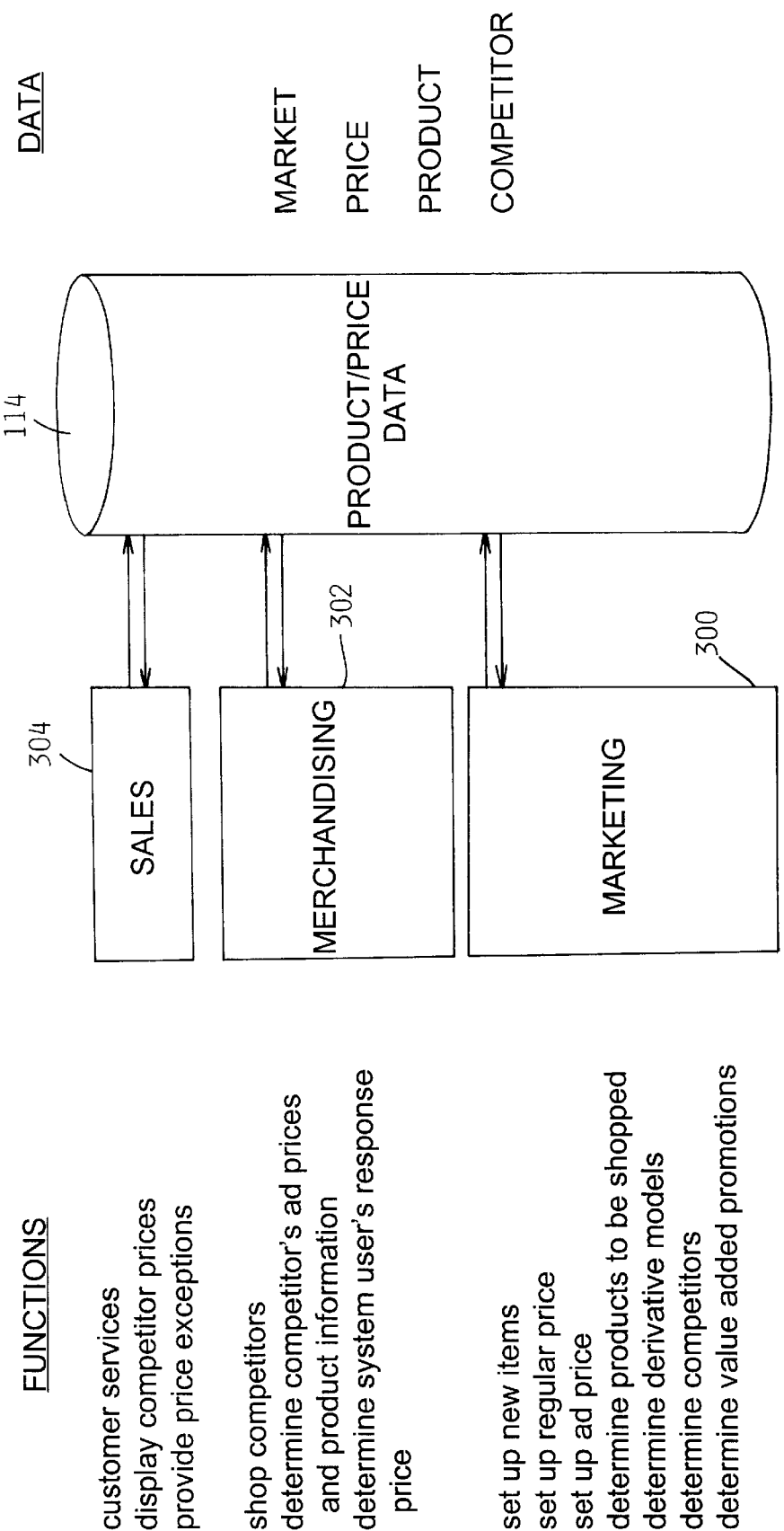
FIG. 5 is a schematic representation of the primary users of the system in accordance with the present invention, with their interactive functions with the database of the system.

As best seen in FIG. 5, marketing, referred generally as numeral reference 300, can update the database in respect of new items to be added to the database, establishing the system user's regular price of the item, set up the ad price, determine products to be shopped, determine derivative models, determine value added promotions and set up new competitors in the database. These functions are manifest in the forms, i.e., screens, of the database of the system (explained in detail hereinafter) wherein marketing updates the database, e.g., one form (screen) for entering the initial details of an item, one for updating the descriptions of the items, one for creating and updating competitors, etc.

After an item and its details appears in the database, at a specified frequency, e.g., twice daily, the price is automatically changed at predetermined frequencies by the system software once new competitors' prices, system user's ad prices, or other special prices are entered.

Merchandising, generally referred to a numeral reference 302, shops competitors and can update the database with respect to competitors' shopped prices, competitors' ad prices and the system user's ad response price.

Sales, generally referred to as numeral reference 304, serves the customers, i.e., buyers, by displaying (via a monitor associated with the system) competitor and system user's prices on products of interest. This is a query only function in the system; no prices are changed. As explained hereinbefore, sales personnel can enter price exceptions into the database of the system. Such price exceptions are recorded in the database but may not effect the repricing function of the software program 204.

It is anticipated that the overall methods just described can be easily performed by use of a relational database management system and an appropriate applications language, to execute the steps of the methods. The following description of one detailed embodiment of a process for practicing the system will therefore refer to conventional flow charts depicted in FIGS. 6, 9 and 10 for explanatory purposes.

Figure 6:
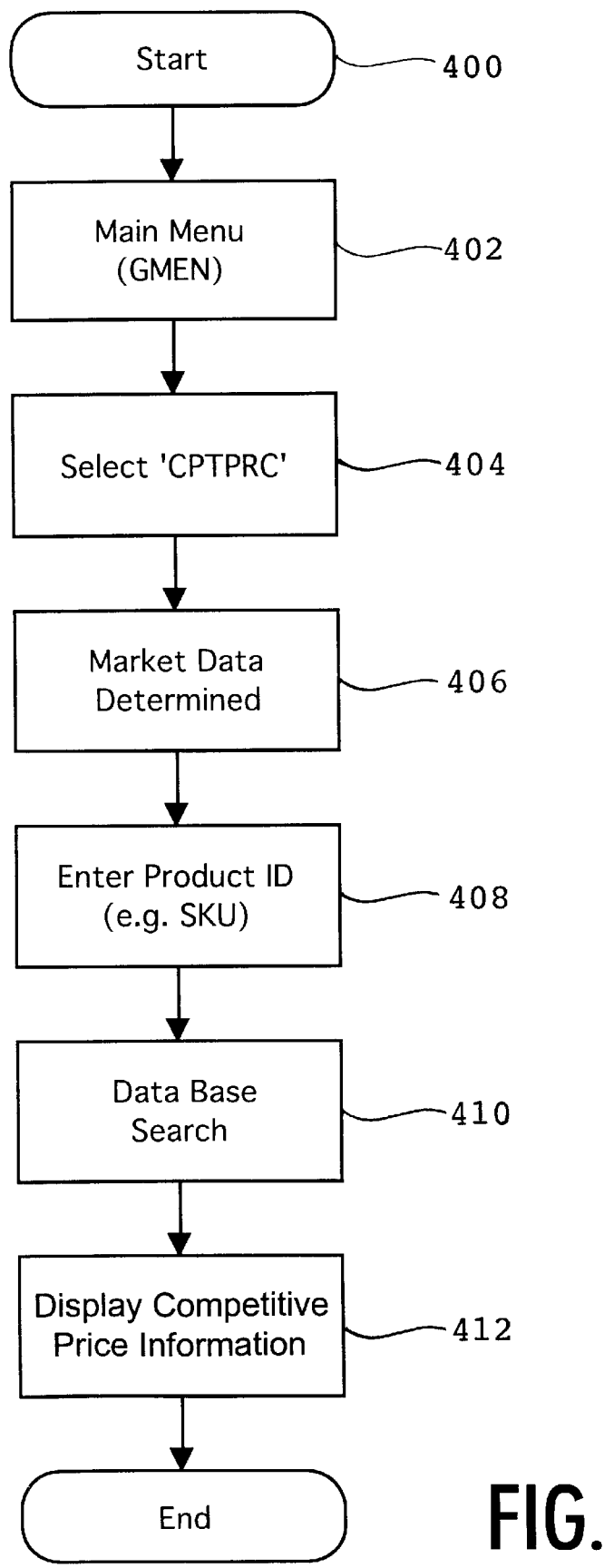
FIG. 6 is a flow chart that represents the price check function of the system.
Figure 7:
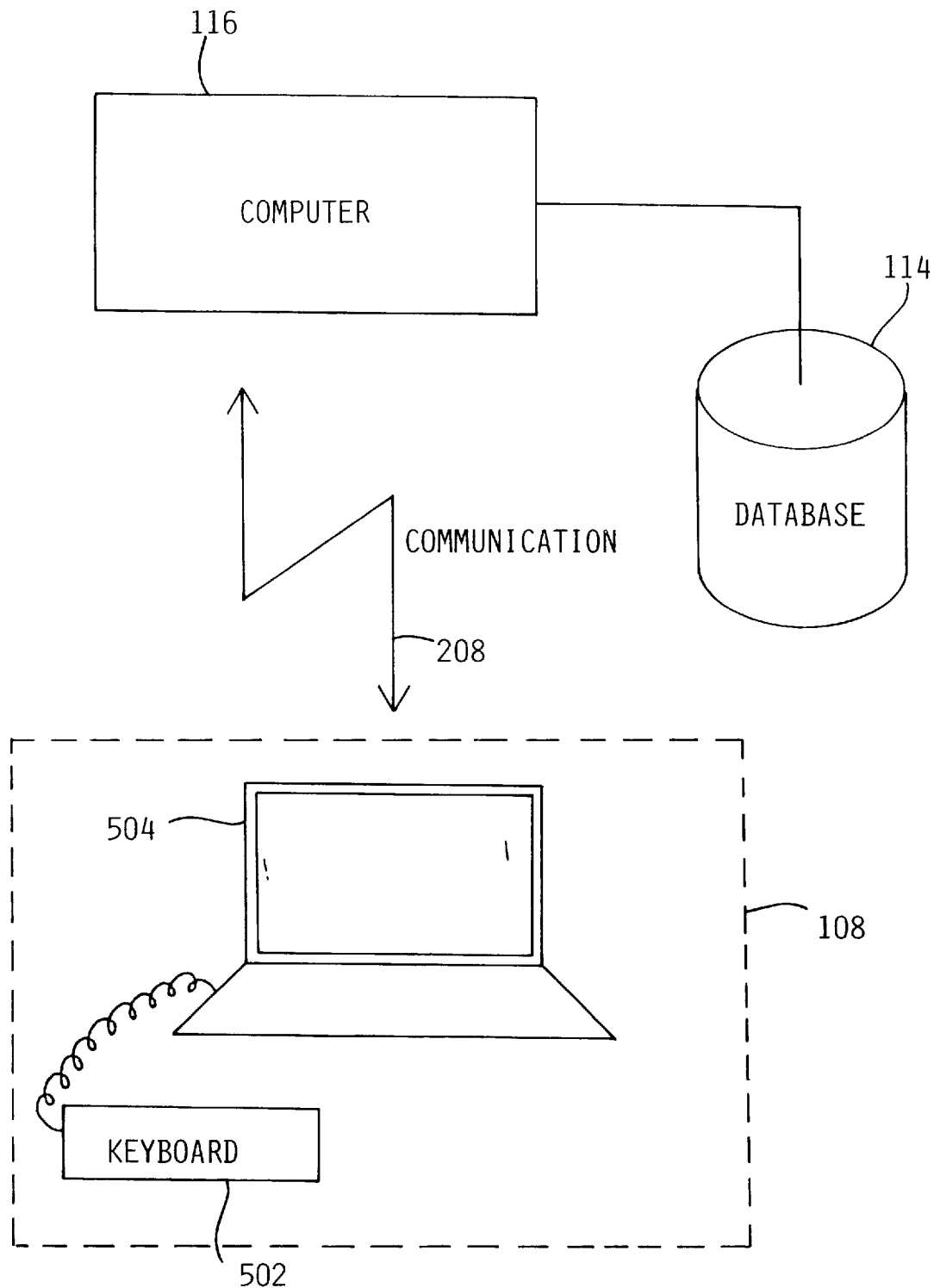
FIG. 7 is a schematic representation of the hardware at a terminal for user input and output.

A unique feature of the system in accordance with the present invention is the customer price check function of the system of the present invention which is depicted in FIG. 6. In this function of the system, purchasing assistance is provided to a buyer at the point of sale, e.g., the sales floor, in the form of a screen, i.e., display, of the system user's price and competitors' prices for the product of interest or a derivative model. Sales computer terminals 108 are located at various locations on the sales floor. Each terminal 108, as schematically illustrated in FIG. 7, includes a keyboard 502, monitor 504 and communication means 208 to the database 114 of the system 100. Via sales computer terminal 108 (or other terminal), and as seen in FIG. 6, the sales user begins at step 400 with a start procedure in which the system 100 is invoked, and at step 402, a menu is displayed on the monitor 504. A salesperson selects, at step 404, a competitive price query screen (CPTPRC), and at step 406, market identification indicia are automatically determined via the network software. At step 408, product identification information, e.g., SKU, is entered. Once the product data information is input, the system performs, at step 410 via the database management system 206, a database search to locate the product and market which matches the market and product data inputted by the sales user.

At step 412, terminal 108 displays the results of the search in a form, an example of which is illustrated in FIG. 8, of competitive price information in the specified geographic market, i.e., it appears on the bottom portion of the screen. The displayed results include company name, location, price and date last shopped. If company displayed is the system user, then screen also displays any value added promotion being offered (e.g., special financing). If the competitor does not have the exact model, the competitor's derivative model is also displayed. The buyer has the opportunity to view the displayed results which demonstrate that the system user has the lowest price in the market for the product of interest, i.e., the system user's price is lower or equal to the lowest competitor's price.

Figure 9:
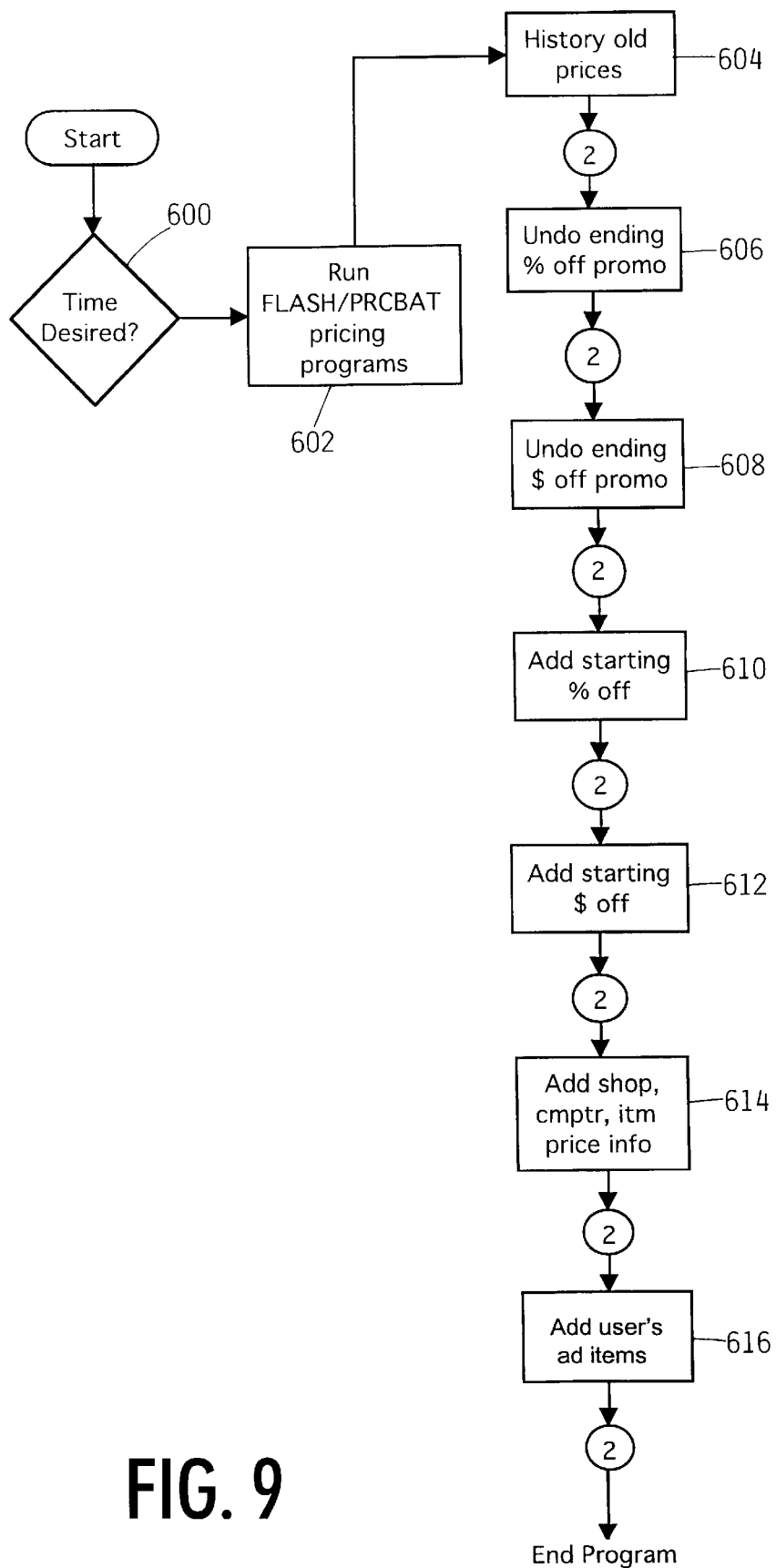
FIG. 9 is a flow chart depicting the automatic pricing software of the system.
Figure 10:
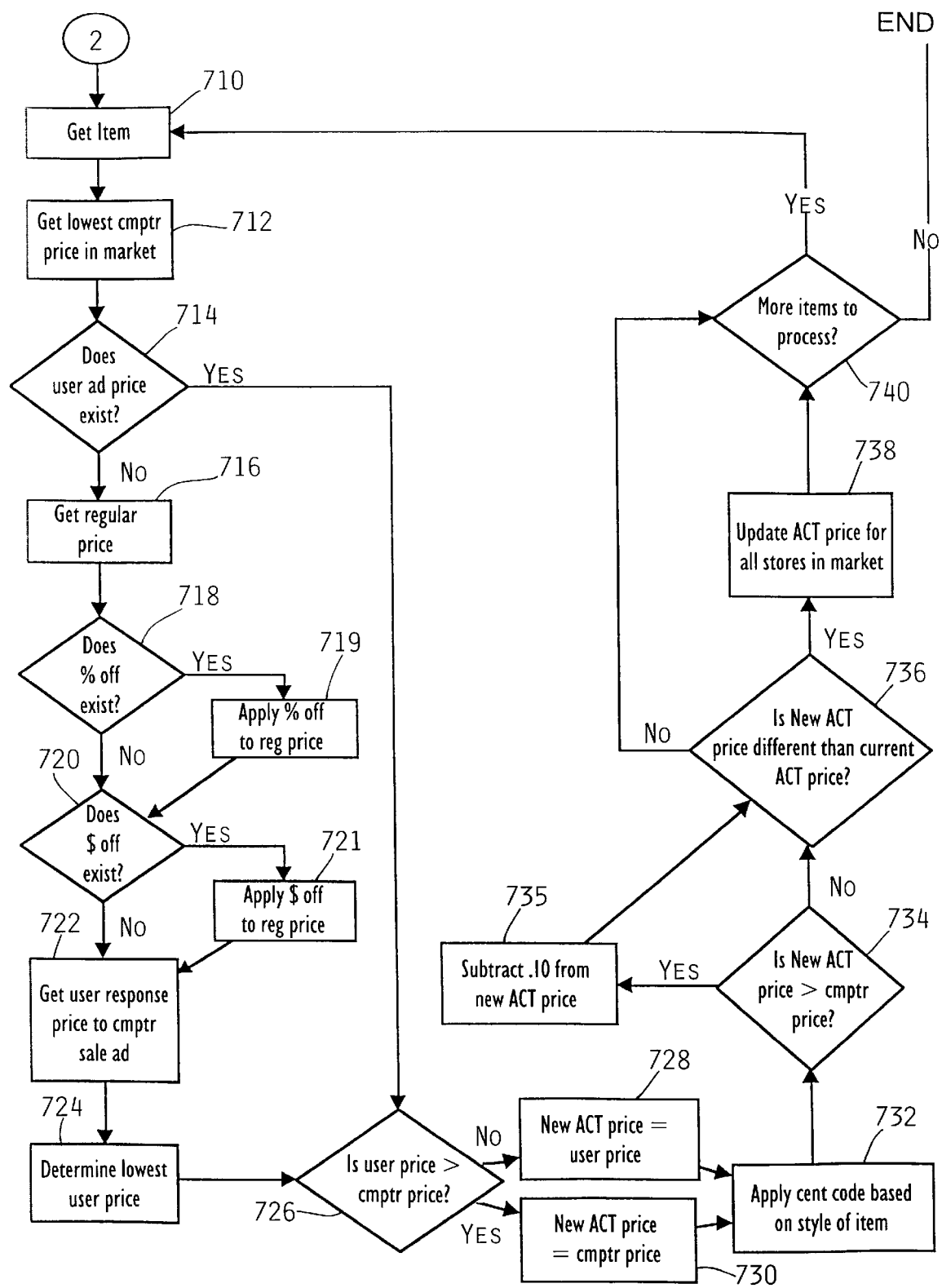
FIG. 10 is a flow chart which depicts a general overview of the repricing logic including different steps taken in repricing items.

FIGS. 9 and 10 illustrate the steps in utilizing the automatic pricing change function of the system. As described hereinabove, the price change function of the system in accordance with the present invention for pricing products in the database implements a pricing strategy (logic) wherein the system user's price is the lowest price in a specified geographic area on a product-by-product basis. The pricing program 204 is run automatically at preselected times, e.g., preselected times each day. Alternatively, program 204 can be run manually. The pricing program 204, in general operation, selects the current active price of the product, compares it with the lowest competitor's price in a specified market, calculates a new user's price to be lower than the competitor's price, changes the ending cent in accordance with a cent code that corresponds to market type, i.e., profit margin of the product, compares the cent coded price with the competitor's price, calculates a new active user price to be lower than or equal to the competitor's price, stores the new active user price in the ITEM PRICE table.

Illustrated in FIGS. 9 and 10 is the specific operation of the pricing software 204 for an item in the database of the system.

FIG. 9 illustrates the various steps at which pricing functions and pricing information is entered into the system for an item in the database of the system. The pricing function starts at step 600 with a query as to the times desired to run the pricing program 204, e.g., 3:00 pm daily. At step 602, the pricing program 204 is run. The pricing functions include, at step 604, deleting pricing information for an item for which the price has expired, e.g., sale price which have ended; undoing a price-percent-off promotion, at step 606; undoing a dollars-off promotion at step 608; at step 610, adding a percent-off promotion; at step 612, adding a dollars-off promotion; at step 614, adding new shopping information, competitor ad information, user price changes, etc.; at step 616, adding user ad information. Each entry of pricing function or pricing information, invokes the specific pricing algorithm, referred to as "2" and depicted in FIG. 10.

As seen in FIG. 10, the system searches and fetches the database for the item (SKU) at step 710 and the lowest competitor price in the market at step 712. At step 714, a test is performed to determine if a user ad price exists. If a user ad price exists, i.e., "yes," a comparison is made at step 726 to determine if the user ad price is greater than the competitor's price. At step 726, if the user ad price is lower than or equal to the competitor's price, i.e., "no," then the new active price becomes the user ad price at step 728 and the pricing cent code is applied at step 732 as is explained hereinafter.

Returning to step 714, if no user ad price exists, i.e., "no", then at step 716, the system searches the database for the regular price, and at step 718, a test is performed to determine if a discount, i.e., percent off, exists. If a percent off exists, i.e., "yes", then it is applied to the regular price at step 719 and a dollars off test is performed at step 720. If, at step 718, no percent off exists, i.e., "no", then at step 720, as noted above, the test is performed to determine if a dollars off exists. If a dollars off exists, i.e.,"yes", then the dollars off is applied to the regular price (or discounted price from step 719) at step 721. At step 722, the system searches and gets the user response price to competitor's ad price, and at step 724 determines the user's lowest price. At step 726, as noted above, the test is performed to compare the user's lowest price with the competitor's price. If the user's lowest price is lower than or equal to the competitor's price, i.e., "no," then, at step 728, the active price becomes the user's lowest price. If the competitor's price is lower than the user's lowest price, i.e., "yes," then, at step 730, the active price becomes the competitor's price.

At this point, i.e., step 732, the cent code is applied to the price of step 728 or 730. The cent code, illustrated in the CENT CODE table of FIG. 36, is a code wherein the last digit of the price indicates the profit margin of the item. As seen in FIG. 36, a "nine" in the last digit of the cent portion of the price, e.g., $149.89, means that the item is a "good" marketing type, i.e., has a certain profit margin. For example, if the price at step 728 (or 730) is $149.82, and the particular item is a "good" market type, the last digit of the cents portion of the price is replaced by the digit code 9, resulting in $149.89. After applying the cent code, a test is performed, at step 734, to determine if the new active price (i.e., with cent code applied) is greater than the competitor's price. If the new active price is greater than the competitor's price, i.e., "yes," then at step 735, $0.10 is subtracted from the new active price. In the example described above, if $149.89 is greater than the competitor's price, the $0.10 is subtracted resulting in an active price of $148.79. Then, at step 736, a test is performed to determine if the new active price is now different from the current active price. If "yes" at step 738, then the active price is updated for all stores in the market. If "no," then at step 740, the test is performed to determine if more items need to be processed. If so, the system returns to step 710 and begins again. If "no," the program ends.

In a preferred embodiment of the invention, the pricing program 204 is run twice a day, i.e., prices for items can change twice a day. The implementing of a specific pricing strategy and a twice a day change in price is virtually unheard of in the retail industry.

Figure 11:
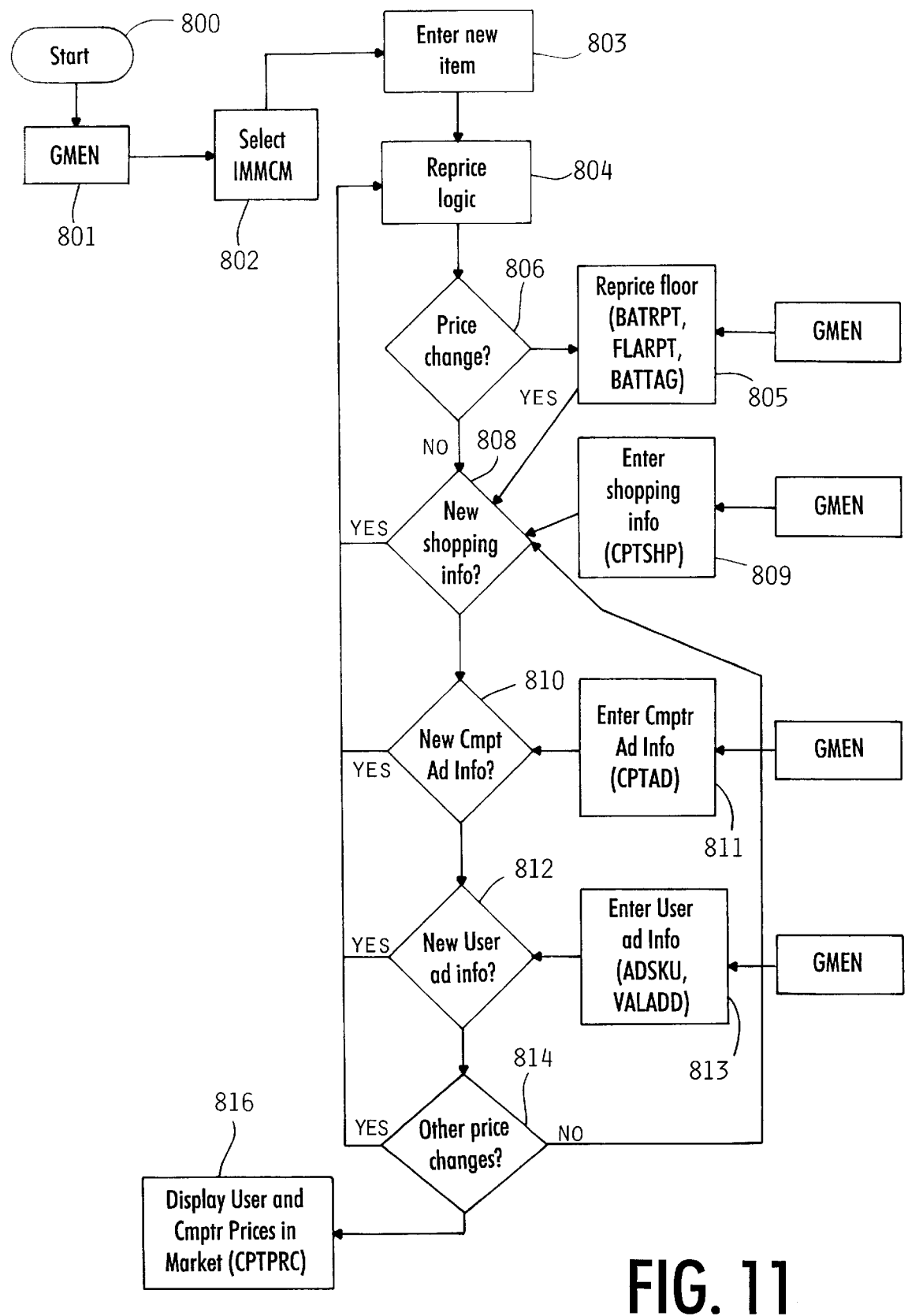
FIG. 11 is a flow chart which illustrates the entry of a new item, i.e., product, into the system of the present invention.

Illustrated in FIG. 11 is a flowchart which represents the operative program for adding a new item to the database of the system in accordance with the present invention. The software of this invention begins at step 800 with a log-in procedure at terminal 108 in which a marketing user is interrogated as to his or her password to ensure that the user has proper authority to access the system. Such system log-ins are well known in the art. The main menu (GMEN) 402 is displayed on the monitor of terminal 108 at step 801. At step 802, the user selects the option desired, in this case, adding a new item, (i.e., chooses the IMMCM screen described in detail hereinafter) and the system automatically checks if the user has authorized access to the option. At step 803, the user enters information to define the new item, generally a SKU, and the regular company price of the item. At step 804, the repricing logic of FIGS. 9 and 10 is invoked.

Step 806 is a decision step inquiring whether or not the price of the new item represents a price change. In the case of a new item, the answer is "yes", and if price changes are in order at decision step 806, then at step 805, the items are repriced on the sales floor. The program continues to step 808 which is a decision step inquiring whether or not new shopping information is available. If no shopping information is available, the program continues to step 810 wherein a test is performed to determine if new competitor ad information is available. If no new competitor ad information is available, the program continues to step 812 wherein it determines if new company ad information is available, the program proceeds to step 814 and a test is performed to determine any other price changes. If "yes," the repricing logic is again invoked and the process of FIG. 9 repeats. If "no," the program returns to step 808. At step 814, display of market prices can be selected. If so, at step 816, the CPTPRC screen 412 is displayed. The CPTPRC screen 412 displays the system user's active price and competitor's price in the market for the same or derivative model.

It is noted that for a new item, the inquiries at each decision step in the operation of the software for a new item is typically "no." It is also noted that various data can be added at each decision step. Typically, the various data, e.g., shopping information, competitor's ad information, are added for items already in the database of the system. As illustrated in the flowchart of FIG. 11, when new information is added, i.e., the decision answer is "yes," then the repricing algorithm is invoked to reprice the item responsive to the new pricing information input.

If shopping information is available at step 808, the user has selected the CPTSHP screen at step 809 (explained in detail below) and entered the new shopping information. The program then accesses the pricing logic (explained in detail hereinbefore) wherein the new item is priced in view of the shopping information. If competitor's ad information is available at step 810, the user selected the CPTAD screen at step 811 (explained in detail below) and has entered the competitor's ad information and the pricing logic is accessed for repricing the item. If user's ad information is available at step 812, the user has selected the ADSKU and/or VALADD screens at step 813 (explained in detail below) and has entered the user ad information.

Figure 12:
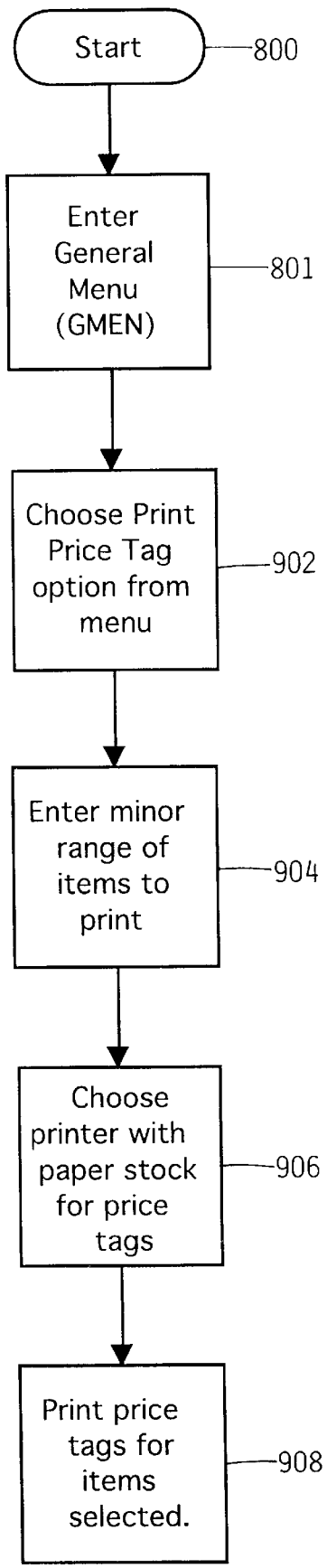
FIG. 12 is a flow chart which illustrates the steps for printing computer generated price tags.

Several reports, BATRPT, FLARPT or BATTAG (see step 805), are requested (as explained hereinafter) to assist salespersons in preparing new price tags. Optionally, the system can print the price tags. Reference is made to FIG. 12 illustrating the steps involved in printing computer generated price tags. The log in procedure is the same as that described in steps 800 and 801 in FIG. 11. At step 902, the user selects PRINT PTAGS from the GMEN. At step 904, the minor range of items whose price tags are to be printed is entered. At step 906, the appropriate printer with appropriate paper stock is selected. At step 908, the price tags are printed.

As explained above generally, the software operating the system in accordance with the present invention managed by a RDBMS and updating of the database is accomplished by accessing by the user various screens that permit various price information data to be entered. Reference is now made to FIGS. 13–32 which illustrate the screens used and reports requestable by the three user groups of the system.

SALES

Figure 13:
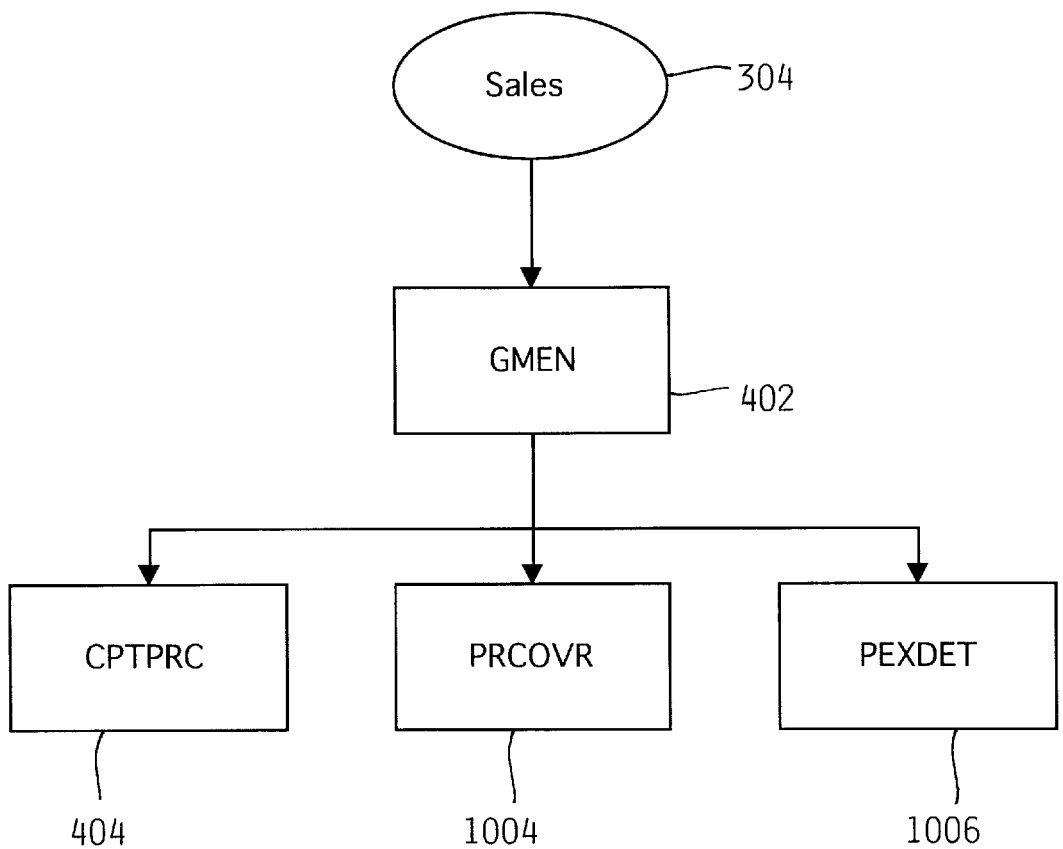
FIG. 13 is a flowchart illustrating the utilization of the system in accordance with the present invention by Sales.

Reference is now made to FIG. 13 which depicts the overall use of the system in accordance with the present invention of the sales department of the system owner. Sales 304 is the primary user of the Competitor Price (CPTPRC) 404 and a Price Override (PRCOVR) 1004 screens and a Price Exception Detail Report (PEXDET) 1006. As described hereinbefore, the Competitor Price screen (CPTPRC) 404 shows a listing of competitors and their prices, the last shopping date for that competitor and the user's active price and value added promotion for same or derivative product, and is used to demonstrate to the buyer that the user has the lowest price on the product of interest.

CPTPRC 404 is selected from the general menu (GMEN) 402 and the CPTPRC screen is displayed on the monitor, as seen in FIG. 6 at 412, and an example of which is illustrated in FIG. 8. As explained hereinbefore, the appropriate market is automatically determined and the user enters the SKU (or vendor or vendor model) and executes query. The CPTPRC screen 412 is query only; no price or other changes can be made. The screen then displays the following: company (the system user's store and the competitors shopped); location (geography location of store shopped); price (the system user's active price first and competitors' prices, tagged or advertised); fn code (the system user's financing plan code, e.g., a "10" may refer to 0% down and no payments or interest until the promotion end date); prem SKU (SKU's if the product is included in premiums except financing); last shop (the date the competitor's store was last shopped); derivative vendor (if vendor model is not an exact match to system user's model but has been determined to be equivalent, i.e., a "derivative").

Figure 14:
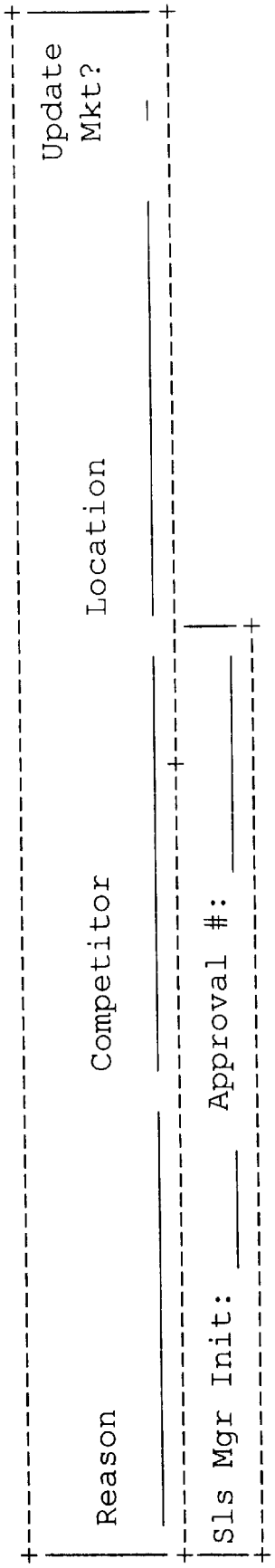
FIG. 14 is a sample of the Price Override screen (PRCOVR)

As described hereinbefore, sales can make point of sale price exception. Such exceptions do not normally enter the repricing logic but the database 1 14 will accept the data into the PRICE CHANGE table and a report can be generated. The Price Override screen (PRCOVR) 1004 is displayed from a sales entry screen (not shown) when the sales person overrides the active price. As seen in FIG. 14, the PRCOVR screen 1004 display prompts the sales person to enter the name of the competitor whose price is being matched and the reason for the price change. The sales user is also prompted as to whether the price change should be used to update the active price in the market of interest in accordance with the functions illustrated in FIG. 11. Thus, the system also permits market price updates at the point of sale. The data are recorded in the PRICE CHANGE table.

The Price Exception Detail report (PEXDET) 1006 provides a detailed list to trace and analyze all price and financing changes made on sales from the previous day. PEXDET 1006 is selected from GMEN 402. As seen in FIG. 15, the PEXDET report 1006 shows sales order number; salesperson code and name; SKU, vendor and derivative information; selling price; active price; selling finance plan number; active financing plan number; reason code (designated reason for price or finance plan change); manager approval initials; whether the price in the market was updated; and comments.

MERCHANDISING

Figure 16:
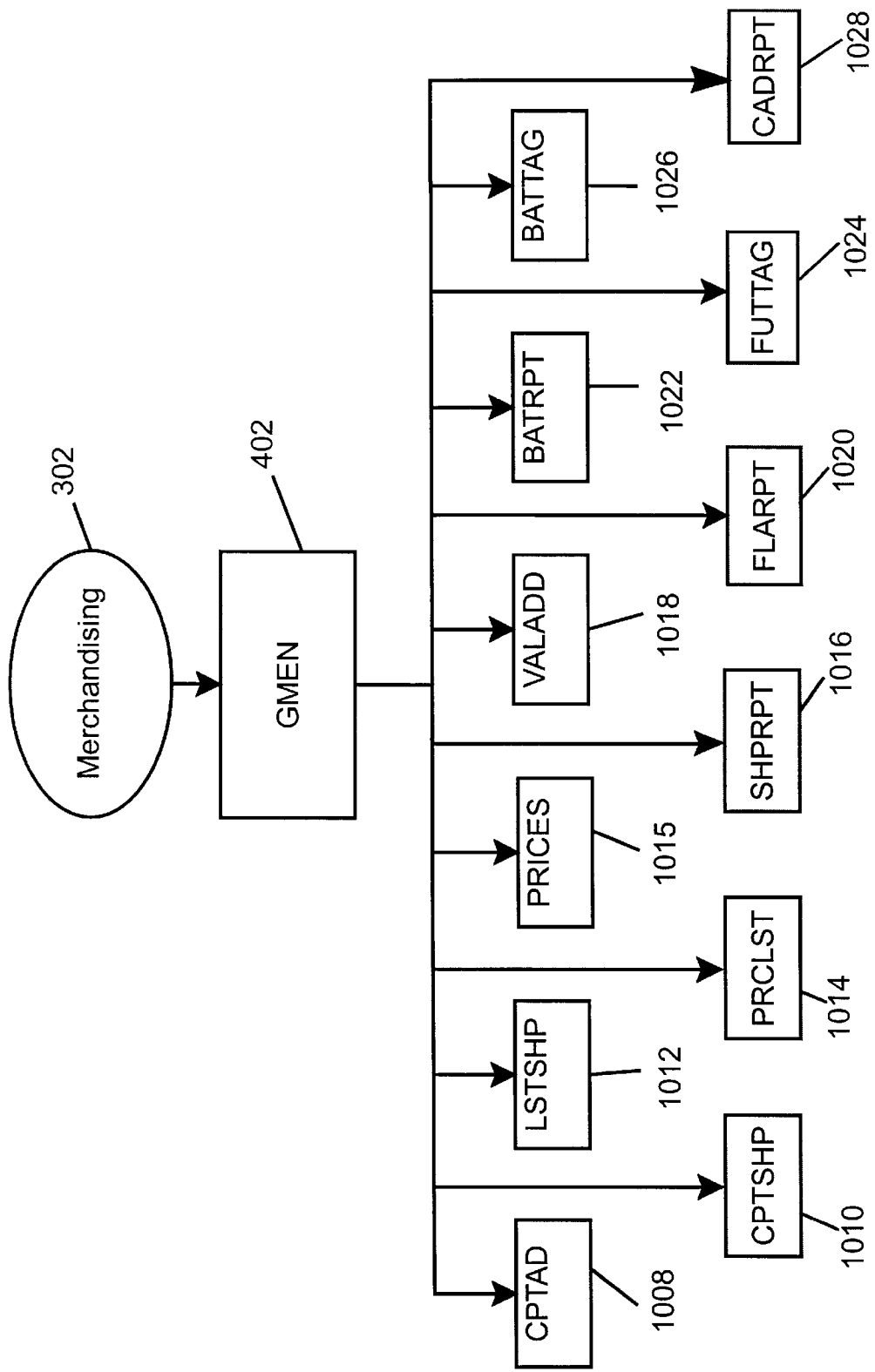

FIG. 16 depicts the overall use of the system in accordance with the present invention of the merchandising department of the system owner. Merchandising 302 is the primary user of a Competitor Ad Response screen (CPTAD) 1008, a Competitor Shopping Entry screen (CPTSHP) 1010, a Last Shopped Query screen (LSTSHP) 1012, an Active Price List report (PRCLST) 1014, an Item Price Query screen (PRICES) 1015, a Competitive Shopping report (SHPRPT) 1016, a Value Added Maintenance (VALADD) 1018, a Flash Price Change report (FLARPT) 1020, a Price Change report (BATRPT) 1022, a Future Price Change report (FUTTAG) 1024, a Price Change Differences report (BATTAG) 1026 and Competitor Ad Response report (CADRPT) 1028.

The Competitor Ad Response Entry screen (CPTAD) 1008 is used to input competitors' advertised prices and to update the user's prices in response to a competitor's advertised price. From the GMEN 402, the Competitor Ad Response Entry screen (CPTAD) 1008 is selected. As seen in FIG. 17, the CPTAD 1008 prompts the user to enter the market(s) desired, the company (system user or competitor) name, and the beginning and ending ad dates. If a system user's item is entered, the vendor and model are determined to be the same as the competitors; if a competitor's vendor and vendor model number are entered, the system user's derivative model must then be entered. The competitor's ad price is then entered. The screen then displays the ad response price for a direct match item; otherwise, the ad response price must be entered. The default response price on a direct match is a fixed percent off, e.g., −3%, the competitor's ad price, but can be changed. Once the ad response price is correct, then a COMMIT command (i.e., a program command to that specifies that the data entered are made a permanent in the database) is given, and items are stored in the AD RESPONSE table, and the price is posted to the PRICE CHANGE table in the database.

The Competitor Shopping Entry screen (CPTSHP) 1010 allows merchandising to enter competitor shopping information. From GMEN 402, CPTSHP 1010 is selected, and as shown in FIG. 18, the market, competitor name, competitor location and shopped date are entered. All competitor items to be shopped by the competitor are then displayed. The user is then prompted as to whether the competitor's newly shopped price is the same (enter "No" or "N") or different (enter "Yes" or "Y") from old price. If "yes", the new shopped price is then entered, and the price type is automatically determined, namely, SALE or REG.

The Last Shopped Query screen (LSTSHP) 1012 shows the user the last time a competitor was shopped for a specific item or an entire range of items. LSTSHP 1012 is selected from GMEN 402 and the user is prompted to enter a SKU or SKU range, a vendor range, a minor range, a competitor, and if desired, a market. The database is queried, and as seen in FIG. 19, the screen displays the market, location, SKU, seller's vendor, vendor's model number, competitor's vendor, vendor's model number and last date shopped.

As seen in FIG. 20, the Active Price List report (PRCLST) 1014 shows a listing of active prices for a given store and minor description range. PRCLST 1014 is selected from GMEN 402 and the user enters market, store, minor range, vendor range, type of SKUs for report (i.e., an indicator of the type of product, e.g., a product for which no new orders can be taken) and whether certain flags are needed, e.g., for only SKUs with premiums attached, for only items on the sales floor and for employee's family prices. The report includes vendor model number, SKU, active price and regular price as well as quantity, and various flags listed above.

As seen in FIG. 21, the Item Price query screen (PRICES) 1015 shows current active price and past pricing history for any SKU. From GMEN 402, PRICES 1015 is selected and the user enters market, competitor, location, weeks history, SKU. The report shows the current active price and the pricing history for the weeks indicated.

As seen in FIG. 22, the Competitive Shopping report (SHPRPT) 1016 lists all products that are to be shopped at a competitor. From GMEN 402, SHPRPT 1016 is selected and the user enters market, competitor, location and beginning and ending minor range. The report displays system user's vendor, system user's vendor model number, last shopped date, competitor vendor, competitor vendor model number. SHPRPT 1016 is then used to gather actual shopping data which is then entered on the CPTSHP screen 1010.

As seen in FIG. 23, the Value Added screen (VALADD) 1018 provides an easy way to identify a SKU or a group of SKUs with specific system user's premium promotions, system user's finance plans, system user's percentage off, competitor's premium promotions and competitor's finance plans. From GMEN 402, VALADD 1018 is selected and the user enters market, date range of promotion and SKU range, minor range, dollar range, vendor range, percent off, dollar off, finance plan number and finance end date or premium SKU, description of promotion. The value added applies to the regular price. If the regular price is higher with the value added than the active price, then the active price remains unchanged. Typically, entering a percentage or dollar off will establish a new active price.

As seen in FIG. 24, the Price Change Flash report (FLARPT) 1020 lists price changes that will become effective later the same day, typically within an hour or less of the time of the report. The report indicates only those products in which the active price will change. For each such product, the report will show minor, user's vendor, user's vendor model number, SKU, description, active price, competitor, as well as floor quantities and various flags and promotions.

As seen in FIG. 25, the Batch Price Change report (BATRPT) 1022 shows all the prices that have changed since yesterday's Flash report and any starting and ending promotions. It is used to update floor tag prices before the user's stores open each day. BATRPT shows only those products where the active price has changed. For each such product, the report will show minor, user's vendor, user's vendor model number, SKU, description, active price, competitor, as well as floor quantities and various flags and promotions.

As seen in FIG. 26, the Future Tag Update report (FUTTAG) 1024 shows all prices that will need to be changed for typical day of week that the user's ads begin, e.g., Sunday, and any starting and ending promotions on Sunday. The report lists all products and indicates which will have price or promotion changes by the price change and promotion change fields. For each product, the report includes minor description, user's vendor, user's vendor model number, SKU, description, active price, competitor, as well as floor quantities, and locations, various flags and finance and/or premium descriptions.

As seen in FIG. 27, the Batch Tag Update report (BATTAG) 1026 shows all price changes starting one day, e.g., Sunday, that are different from those shown on a previous day's, e.g., Thursday's, FUTTAG. BATTAG 1026 is selected from GMEN 402. For each product where a price difference has occurred, BATTAG 1026 includes minor description, user's vendor, user's vendor model number, SKU, description, active price, competitor, as well as floor quantities and locations, and various flags and other descriptions.

As seen in FIG. 28, the Competitor Ad Response report (CADRPT) 1028 lists competitor ad information and seller's match-up product to the competitor's ad. From GMEN 402, CADRPT 1028 is selected and the user enters the market desired and the beginning ad date. The report displays for each product, major description, SKU, user's vendor, user's vendor model number, description, active price, competitor's ad price, competitor, competitor vendor, competitor vendor model number and ending ad date.

MARKETING

Figure 29:
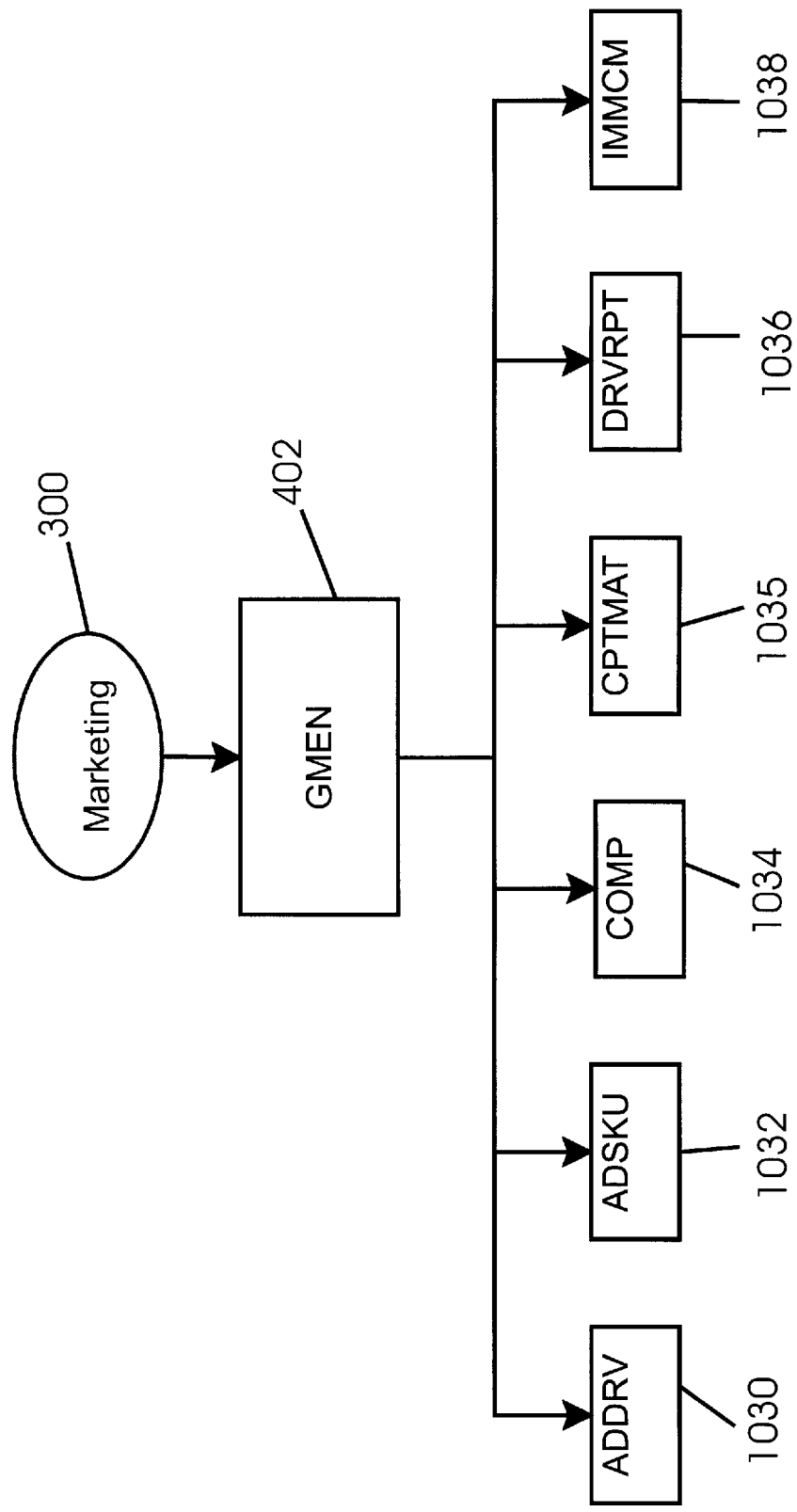
FIG. 29 is a flowchart illustrating the utilization of the system in accordance with the present invention by Marketing.

FIG. 29 depicts the overall use of the system in accordance with the present invention of the marketing department of the system owner. Marketing 300 primarily utilizes a Sale Ad Derivative report (ADDRV) 1030, an Advertised SKU Maintenance screen (ADSKU) 1032, a Price Competitor Maintenance screen (COMP) 1034, a Competitor SKU Match-up screen (CPTMAT) 1035, a Derivative Alignment report (DRVRPT) 1036 and Item Master Maintenance screen (IMMCM) 1038. As seen in FIG. 30, the Sale Ad Derivative report (ADDRV) 1030 displays temporary derivatives created due to system user's response to a competitor's ad. ADDRV 1030 is reported by date range and minor range. ADDRV 1030 shows market, competitor, minor, SKU, user's vendor, user's vendor model number, competitor vendor, competitor vendor model number, beginning ad date, ending ad date, competitor price and response price.

As seen in FIG. 31, the Advertised SKU Maintenance screen (ADSKU) 1032 is used to set up products to be featured on future ads. From GMEN 402, ADSKU 1032 is selected and the user enters market, SKU, ad dates, ad price, quantities needed for ad, and enters dates the user wishes the system to reserve the product. These records are then used when the ad becomes effective to create an ADV price for these items.

As seen in FIG. 32, the Price Competitor Maintenance screen (COMP) 1034 is used to create a competitor, store location and indicate the frequency of shopping. COMP 1034 is selected from GMEN 402 and the user enters competitor name, market, store location, location description and days between shopping. COMP 1034 can also be used to query the entire list of competitors and their market, location and shopping frequency. The screen displays a list of competitors and the competitor of interested is selected; the screen then displays the indicated information for that competitor.

As seen in FIG. 33, the Competitor SKU Match-up screen (CPTMAT) 1035 is used to enter items that will be shopped at a competitor and derivative models carried by the competitor. CPTMAT 1035 is selected from GMEN 402 and the user enters the sku, markets, vendor and competitor. To enter competitor derivative information, the user selects "R" for derivative, and items and derivatives for the competitor entered will be displayed. The user then selects the seller's product for which the derivative model corresponds. The user then enters the competitor vendor and competitor vendor model number and the commit command. To select items for shopping, the user chooses "S" for deselect, and all items with their shopping indicator will be displayed. Items can then be added or deleted from the competitor's shopping by using the deselect field.

As seen in FIG. 34, the Derivative Alignment report (DRVRPT) 1036 is a listing of all permanent competitor derivative products. FIG. 34 shows a partial listing of derivative models. DRVRPT 1036 is selected from GMEN 402 and run by entering vendor codes and minor codes. DRVRPT 1036 displays SKU, system user's vendor, system user's vendor model number, market, competitor, competitor vendor, competitor vendor model number and shop status.

As seen in FIG. 35, the Item Master Maintenance screen (IMMCM) 1038 is used to query and/or update existing SKUs or to create new SKUs. IMMCM 1038 is selected from the GMEN 402. If the query mode is desired, the user then enters the SKU and executes query. The screen displays SKU, minor code, category code, style code, family code, vendor code, vendor name, vendor stock number, item type code, description, delivery volume, freight factor, last receiving date, retail price change last date, last active price, invoice cost, retail price, replacement cost, advertised price, commission code, warrantability.

As described hereinbefore, the IMMCM 1038 is used to create new SKUs. If new items data are to be entered into the database, the data identification information and the regular price of the item are entered in the appropriate blocks designated on the IMMCM screen 1038. The data are entered in the ITEM table and the ITEM PRICE table. As seen in FIG. 11, once entered into the system, price change information, which includes shopping information, competitor ad information and system user ad information, can be entered for this item using the CPTSHP, CPTAD and ADSKU, VALADD screens, respectively.

In summary, the present invention provides a price management and central system for a plurality of goods in a plurality of markets. The system automatically prices and reprices items responsive to market changes, such as competitors' shopped prices and competitors' ad price. The system permits price comparisons between system user's items and competitors' derivative models which are not identical but have substantially similar features and specification. The system accommodates a plurality of competitors and corresponding price information, and for a single competitor can show multiple locations and multiple prices. The system tracks price exceptions, especially for employees and family, financing terms and premium offers associated with an item price and permits point of sale price updating.

While the present invention has now been described and exemplified with some specificity, those skilled in the art will appreciate the various modifications, including variations, additions, and omissions, that may be made in what has been described. Accordingly, it is intended that these modifications also be encompassed by the present invention and that the scope of the present invention be limited solely by the broadest interpretation that lawfully can be accorded the appended claims.

We claim:

1. A computer apparatus for pricing products and assisting a buyer in comparing competitors' prices for a product and purchasing the product, said apparatus having a central processing unit, a main memory medium, and data storage means for storing data records, said apparatus comprising:

a database of data records, including product data, said product data including, for each product of a plurality of products sold by a seller, a product identification number, an active price and a market code;

means for receiving and storing in said database a competitor's prices for products of said plurality of products, the competitor's prices based on the seller shopping at a predetermined intervals at a competitor's store at a competitor's store location and based on the seller obtaining a competitor's advertised prices for the products of the plurality of products;

means for inputting a price change frequency pattern;

means for searching said database and capturing the active price and the competitor's price for a selected product and for deleting expired prices;

means for comparing the active price for the selected product with the competitor's price for the selected product and re-pricing the selected product to provide an updated active price according to predetermined rules responsive to a characteristic of the competitor's price;

means for storing said updated active price in said database;

means for retrieving from said database said updated active price and said competitor's price as a comparative product price set; and a computer terminal display having a monitor having a display screen for displaying said comparative product price set to the buyer at a point of sale, wherein said comparative product price set includes the updated active price for the selected product, and for each competitor, a competitor's name, the competitor's store location, the competitor's price and a date that the competitors store was last shopped.

2. The apparatus of claim 1, wherein said means for receiving and storing a competitors prices includes means for inputting product data, including the product identification number of a competitor's derivative product corresponding to a product in said database and a competitors price for said derivative product; and said means for comparing includes means for comparing the user's active price for a selected product to competitors price for said derivative product.

3. The apparatus of claim 2, wherein the competitor includes a plurality of competitors in a plurality of markets.

4. The apparatus of claim 3, wherein said comparative price set includes one or more competitor's prices for derivative products.

5. The apparatus of claim 3, further comprising means for generating price tags printed with said updated active price.

6. The apparatus of claim 3, wherein said product data further includes data describing financing terms and premium offered terms.

7. The apparatus of claim 3, further comprising price exception means, at the point of sale, for selling a selected product to the buyer for an exceptional price which is different from said active price, and means for repricing the selected product to provide said exceptional price as said updated active price.

8. The apparatus of claim 1, wherein said database is a relational database, and further comprising database management means for managing said relational data base including means for creating tables to contain the data records stored in said database, said tables including an ITEM table, an ITEM PRICE table, an ADVERTISED SKU table, an AD RESPONSE table, a CENT CODE table, a COMPETITOR table, a COMPETITOR LOCATION table, a COMPETITOR SHOPPED-ITEMS table, an ITEM DERIVATIVE table, a PRICE CHANGE table, a VALUE ADDED ITEM table, and a REASON table.

9. An enterprise-wide integrated computer system for storing, processing and reporting pricing information regarding a plurality of products sold a seller in a plurality of stores in a plurality of markets, comprising:

a central processing unit, a main memory, data storage means for storing in a database, product data concerning each product sold by the seller, said product data concerning each product including a product identification number, and pricing data, said pricing data including, for each product, an active price, a market code, and one or more competitor's prices;

means for managing the database, including means for modifying, storing, retrieving and manipulating said product data;

a plurality of applications programs including a pricing software program;

said pricing program comprising means for processing pricing data including means for communicating with the central processing unit, memory and data storage means, means for changing pricing data at predetermined intervals on the basis of a price change frequency pattern, said means for changing pricing data including means for accessing pricing data in the database on a product-by-product basis and a market-by-market basis, for capturing and deleting expired pricing data and for capturing, modifying and processing said pricing data to provide updated pricing data according to predetermined rules and storing said updated pricing data;

said predetermined rules including selection of said active price of the product, comparison of said active price of the product with a lowest competitor's price of said one or more competitor's prices; calculation of a new active price to be lower than the lowest competitor's price, creation of a cent-coded price by changing an ending cent in said new active price in accordance with a cent code corresponding to a profit margin on the product, comparison of the cent-coded price with the lowest competitors price, calculation of an updated active price lower than or equal to the lowest competitor's price, and storage of the updated active price.

10. The system of claim 9, further comprising a sales subsystem, a merchandising subsystem and a marketing subsystem, said sales subsystem comprising means for processing sales information including means for communicating with the central processing unit, memory and data storage means and means for accessing updated pricing data in the database on a product-by-product basis and a market-by-market basis, and means for capturing from said database and displaying a comparative price set of updated pricing data and competitors' prices for a selected product for a selected market to a buyer at a point of sale;

said merchandising subsystem comprising means for processing merchandising information including means for communicating with the central processing unit, memory and data storage means and means for accessing updated pricing data in the database on a product-by-product basis and a market-by-market basis, means for maintaining and updating information on competitor's shopped prices and advertised prices, means for determining an advertisement response price responsive to competitor's advertised prices;

said marketing subsystem comprising means for processing marketing information including means for communicating with the central processing unit, memory and data storage means and means for accessing updated pricing data in the database on a product-by-product basis and a market-by-market basis, means for creating, storing and maintaining information on all existing and new products of user and products of competitors, including means for creating, storing and maintaining a regular price for each product of said plurality of products, for creating, storing and maintaining an advertised price as needed for each product of said plurality of products, for creating, storing and maintaining competitors and products thereof to be shopped, and creating, storing and maintaining competitors' derivative models.

11. The system of claim 9, wherein said rules include changing said active price to an updated active price which is less than or equal to any competitor's price, said updated price determined according to whether said competitor's price is an advertised price, a shopped price or a value-added price.

12. The system of claim 9, wherein, in said pricing program, means for capturing, modifying and processing said product data includes means for re-pricing said active price to provide an exceptional price for a selected buyer and further means for changing said user's active price to said exceptional price.

13. The system of claim 9, further comprising reports subsystem, said reports subsystem comprising means for displaying, to the seller, a menu of types of reports; means for accepting, from the seller, a choice of a selected report; means for searching the database to locate product information data necessary to said selected report; means for displaying said selected report to the seller.

14. The system of claim 13, wherein said menu of reports includes a price change report, a flash price change report, a competitive shopping list and a competitor ad response report.

15. The system of claim 9, wherein said database is accessible by remote terminals in said plurality of said markets of said seller.

16. A method of utilizing a computer with a main memory and a display to price a plurality of products responsive to competitor's price using predetermined pricing rules, said system comprising:

displaying a product identification display to a buyer on a computer terminal display having a monitor having a display screen, the product identification display including a product identification number for the product, a product description and a product price set, said price set including an active price and one or more competitor's prices;

inputting a frequency of price change pattern;

receiving, from the user, changes in one or more competitor's prices for the product at predetermined intervals;

the computer (i) changing, based on said frequency of said price change pattern, the active price to an updated active price responsive to changes in the competitor's prices using the predetermined pricing rules, the predetermined pricing rules comprising determining one or more competitor's prices from new competitor's shopped prices and from new competitors advertised prices, determining a lowest competitor price of said one or more competitor's prices in a market, selecting said active price of said product, comparing said active price of said product with the lowest competitor's price; calculating a new active price to be lower than the lowest competitor's price, creating a cent-coded price by changing an ending cent in said new active price in accordance with a cent code corresponding to a profit margin of said product, comparing the cent-coded price with the lowest competitor's price, calculating an updated active price lower than or equal to the lowest competitor's price, and storing said updated active price, (i) providing, on a product-by-product, market-by-market basis, an updated comparative price set of the updated active price and the competitor's prices, and (ii) displaying said price set on said display screen to a buyer at a point of sale, said comparative price set including the updated active price for the selected product, and for each competitor, a competitor's name, the competitor's store location, the competitor's price and a date that the competitor's store was last shopped.

17. An apparatus for providing, maintaining, and modifying pricing information for a seller and one or more competitors on a plurality of products in a plurality of markets in a particular industry, comprising:

a computer for storing and executing one or more programs and having a display and one or more input devices;

a database operatively coupled with said computer, for storing changeable product data for each product of a plurality of products, said product data including a product identification number, an active price, competitor(s) prices and a market code;

a database management program, in execution on said computer and coupled to said database, for selectively accessing said database, including retrieving current values of said product data, and receiving updates to the values of said product data at predetermined intervals;

a pricing program in execution on said computer for pricing products responsive to market price changes, said program, operatively communicating with said database management program, for accessing, for a selected market code, the active price and competitor(s) prices in the database, for capturing and deleting expired price data and for capturing and modifying said active price responsive to said competitor(s) prices to provide an updated active price and storing said updated active price in the database, said pricing program having predetermined pricing rules comprising determination of the competitor's prices from new competitor's shopped price and from new competitor's advertised prices; determination of a lowest competitor's price of said one or more competitor's prices in the market; selection of said active price of said product; comparison of said active price of said product with the lowest competitor's price; calculation of a new active price to be lower than the lowest competitor's price, creation of a cent-coded price by changing an ending cent in said new active price in accordance with a cent code corresponding to a profit margin of said product, comparison of the cent-coded price with the lowest competitor's price, calculation of an updated active price lower than or equal to the lowest competitor's price, and storing said updated active price; and a database query program in execution on said computer for outputting comparative pricing data, said program, operatively communicating with said database management program, for retrieving said updated active price and said competitor(s) prices on a product-by-product and market-by-market basis to provide a comparative price set, and displaying, for a selected product in a selected market, said comparative price set to a buyer at a point of sale.

18. A method for automatically pricing and dispensing information on products sold by a seller and a plurality of competitors in a particular industry, comprising the computer-aided steps of:

pricing a plurality of products, each product of said plurality having product identification data including a product identification number and an active price;

obtaining competitor pricing for said plurality of products by shopping at a predetermined frequency at a competitors store at a competitors store location and by obtaining a competitors advertised prices for the products;

comparing, for each product of said plurality, the active price and the competitor's price;

determining from the result of comparing, whether a competitor's price is less than the active price for a selected product of said plurality of products;

determining a lowest competitors price from the competitor pricing for the selected product;

modifying the active price, responsive to an indication that said lowest competitors price is less than the active price, to a new active price which is lower or equal to said lowest competitor's price by, (i) creating a cent-coded price by changing an ending cent in the new active price in accordance with a cent code corresponding to a profit margin of said product;

(ii) comparing the cent-coded price with the lowest competitor's price;

(iii) calculating an updated active price lower than or equal to the lowest competitor's price;

arranging the updated active price and competitor's price into a comparative price information set, said comparative price information set including the updated active price for the selected product, and, for each competitor, a competitors name, the competitor's store location, the competitors price and a date that the competitors store was last shopped; and outputting the comparative pricing information set to a customer at a point of sale.

19. A computerized system for assisting a retail buyer with a buying decision, said system comprising:

a point of sale computer terminal having a monitor having a display screen, said point of sale terminal having an input device and means for generating a product identification display for each of a plurality of products sold by a seller in a plurality of stores in a plurality of markets, in response to a query by a retail buyer, said product identification display for each of the plurality of products including a comparative price information set which includes an active price for the product queried, one or more competitors' prices for the product including a competitors name, the competitor's store location, and a date that the competitor's store was last shopped, said active price and competitors' prices indicative of a market at which the point of sale terminal is located;

a database system coupled to said point of sale terminal, said database system comprising a database for storing changeable product data for each product of a plurality of products, said product data including a product identification number, the active price, competitor(s) prices and a market code; and a database management program, coupled to said database, for selectively accessing said database, including retrieving current values of said product data, and receiving updates to the values of said product data at predetermined intervals;

means for compiling competitor price information from a plurality of competitors in a plurality of markets to determine for each competitor, a competitor price; said means including, for each product of the plurality of products, shopping means for shopping at a predetermined intervals at a competitor's store at a competitor's store location to determine a competitor's shopped price, analyzing means for reviewing competitor's advertisements to determine a competitors advertised price; said shopping means and said analyzing means for further determining a competitor's value-added price, said competitor price being a shopped price, an advertised price or a value-added price;

a pricing program for pricing and re-pricing products, said program, operatively communicating with said database management program, for accessing, for a selected market code, the active price and competitor(s) prices in the database, for capturing and deleting expired price data and for capturing and modifying said active price responsive to said competitor(s) prices to provide an updated active price and storing said updated active price in the database, said pricing program having predetermined pricing rules comprising determination of, for each competitor, the competitor's price from competitor shopped price data, from new competitor's advertised price data and competitor value added price data, determination of a lowest competitor price in the market of said one or more competitors prices, selection of said active price of the product, comparison of said active price with the lowest competitor's price; calculation of a new active price to be lower than the lowest competitor's price, creation of a cent-coded price by changing an ending cent in said new user's price in accordance with a cent code corresponding to a profit margin of the product, comparison of the cent-coded price with the lowest competitor's price, calculation of a updated active price lower than or equal to the lowest competitor's price, and storing said updated active price; and a database query program coupled to said point of sale terminal for outputting comparative pricing data, said program, operatively communicating with said database management program, for retrieving said updated active price and said competitor(s) prices on a product-by-product and market-by-market basis to provide a comparative price set, and displaying, for a selected product in a selected market, said comparative price set to the retail buyer to facilitate the buyer's buying decision.

\* \* \* \* \*